US010674132B2

United States Patent
Hyakudai et al.

(10) Patent No.: US 10,674,132 B2
(45) Date of Patent: Jun. 2, 2020

(54) FRAME GENERATION APPARATUS, FRAME GENERATION METHOD, IMAGE RESTORATION APPARATUS, IMAGE RESTORATION METHOD, IMAGE TRANSMISSION SYSTEM, AND IMAGE TRANSMISSION METHOD

(71) Applicant: SONY CORPORATION, Tokyo (JP)

(72) Inventors: Toshihisa Hyakudai, Kanagawa (JP); Kazuaki Toba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 15/777,840

(22) PCT Filed: Sep. 14, 2016

(86) PCT No.: PCT/JP2016/077114
§ 371 (c)(1),
(2) Date: May 21, 2018

(87) PCT Pub. No.: WO2017/094318
PCT Pub. Date: Jun. 8, 2017

(65) Prior Publication Data
US 2018/0338125 A1 Nov. 22, 2018

(30) Foreign Application Priority Data
Dec. 3, 2015 (JP) .................................. 2015-236226

(51) Int. Cl.
*H04N 11/20* (2006.01)
*H04N 11/02* (2006.01)
(Continued)

(52) U.S. Cl.
CPC ........... *H04N 11/20* (2013.01); *H04N 7/0806* (2013.01); *H04N 11/02* (2013.01);
(Continued)

(58) Field of Classification Search
CPC combination set(s) only.
See application file for complete search history.

(56) References Cited

U.S. PATENT DOCUMENTS

| 9,641,875 B2* | 5/2017 | Nishida .............. H04N 21/2381 |
| 2014/0211094 A1 | 7/2014 | Minamoto |
| 2015/0237382 A1 | 8/2015 | Nishida et al. |

FOREIGN PATENT DOCUMENTS

| CN | 103974019 A | 8/2014 |
| EP | 2894862 A1 | 7/2015 |

(Continued)

OTHER PUBLICATIONS

International Search Report and Written Opinion of PCT Application No. PCT/JP2016/077114, dated Dec. 6, 2016, 08 pages of ISRWO.

*Primary Examiner* — Janese Duley
(74) *Attorney, Agent, or Firm* — Chip Law Group

(57) ABSTRACT

A frame generation apparatus including an image division section configured to, in a case where a horizontal-direction pixel number in a video signal is set to integers of 0 to N−1 and a vertical-direction line number in the video signal is set to integers of 0 to M−1, perform an operation of dividing a pixel group included in a line of which the vertical-direction line number is 2m and a pixel group included in a line of which the vertical-direction line number is (2m+1) on a basis of color format information of the video signal, for all integers m satisfying $0 \leq m \leq (M/2)-1$, and thereby obtain a plurality of divided signals, and a frame generation section configured to generate a plurality of frames individually including the plurality of divided signals.

19 Claims, 15 Drawing Sheets

(51) Int. Cl.
*H04N 21/4402* (2011.01)
*H04N 21/81* (2011.01)
*H04N 21/845* (2011.01)
*H04N 7/08* (2006.01)

(52) U.S. Cl.
CPC ....... *H04N 21/4402* (2013.01); *H04N 21/816* (2013.01); *H04N 21/8455* (2013.01); *H04N 21/8458* (2013.01)

(56) References Cited

FOREIGN PATENT DOCUMENTS

| | | |
|---|---|---|
| JP | 2014-146924 A | 8/2014 |
| KR | 10-2015-0046179 A | 4/2015 |
| WO | 2014/038597 A1 | 3/2014 |

* cited by examiner

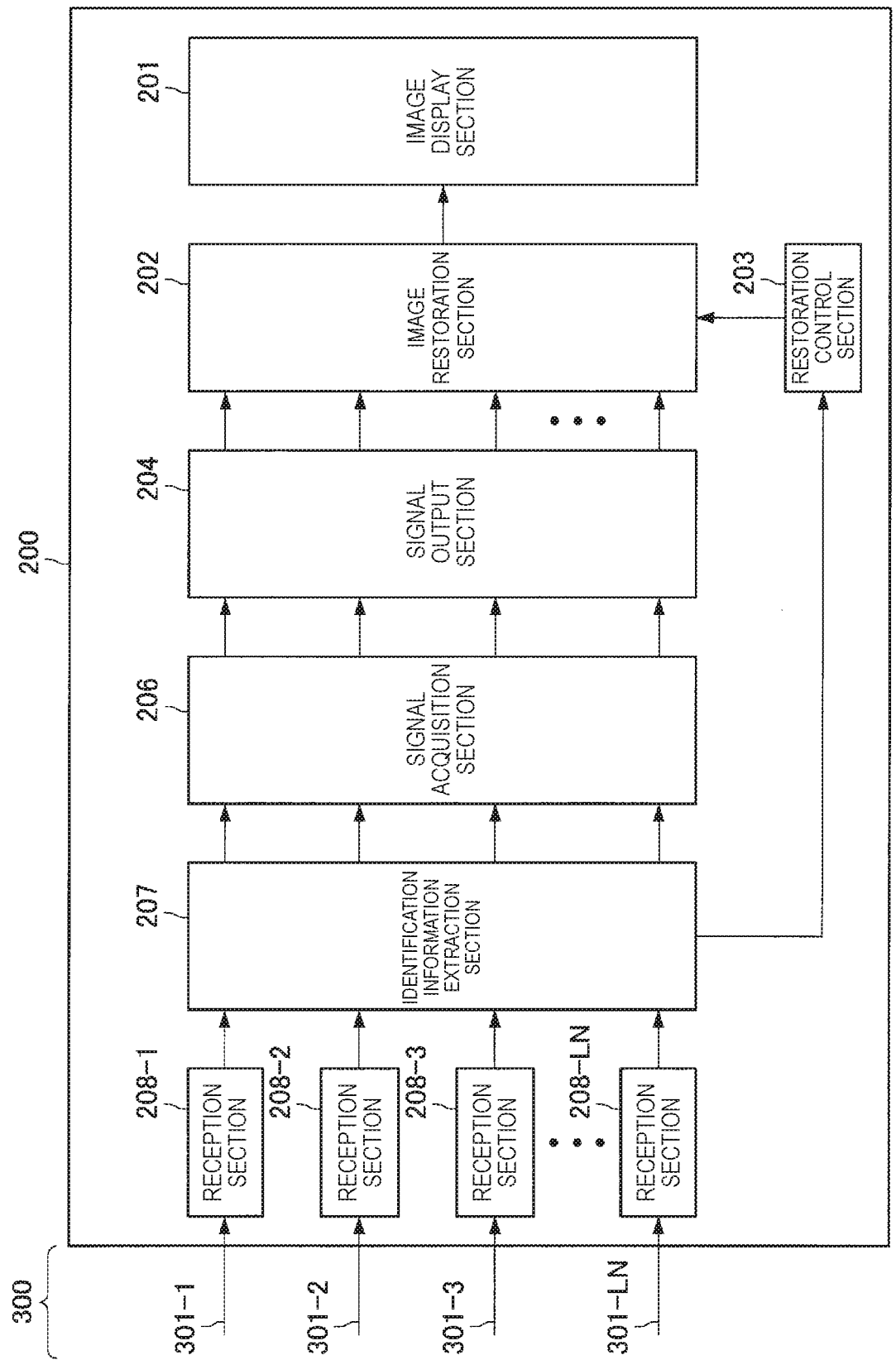

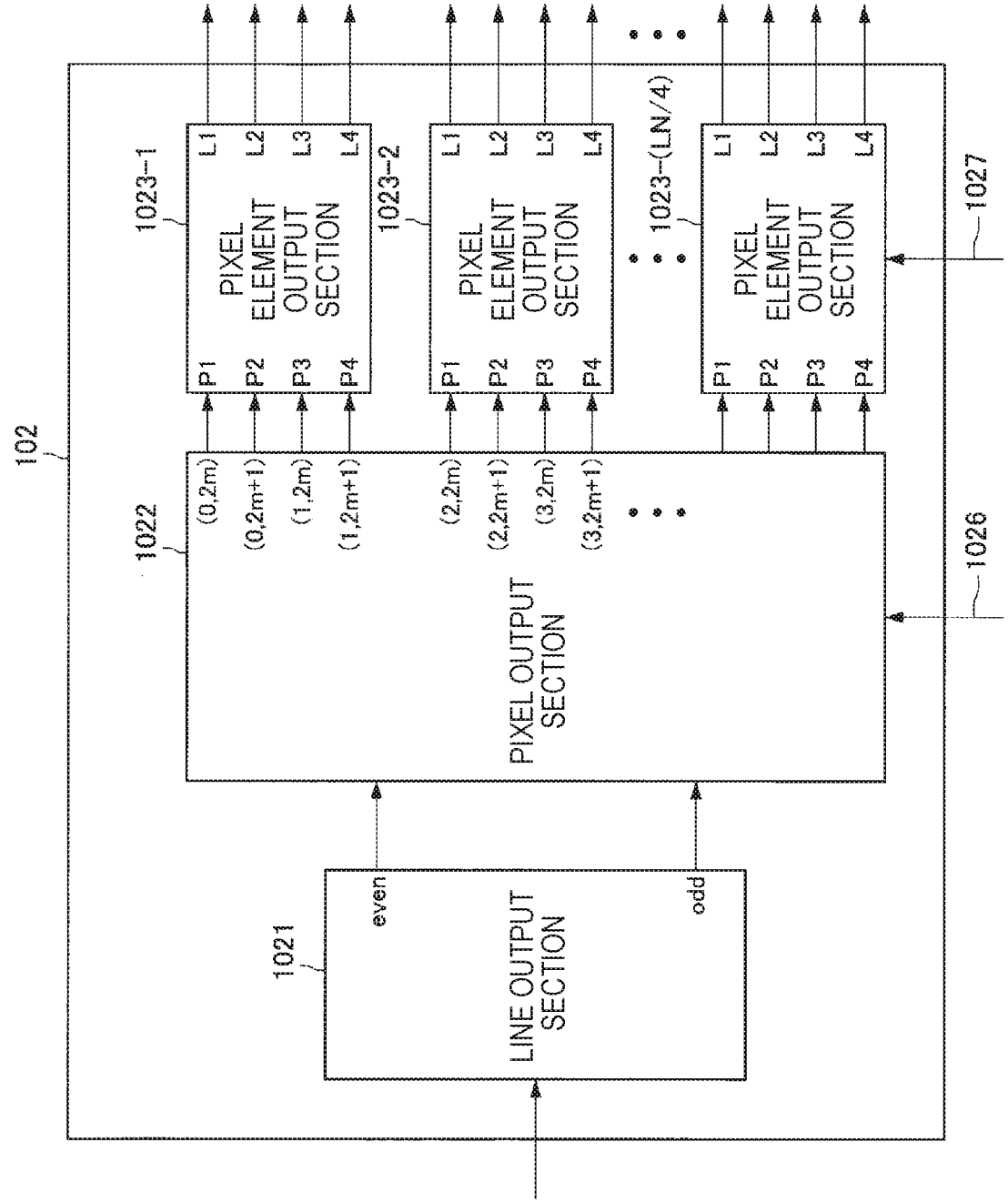

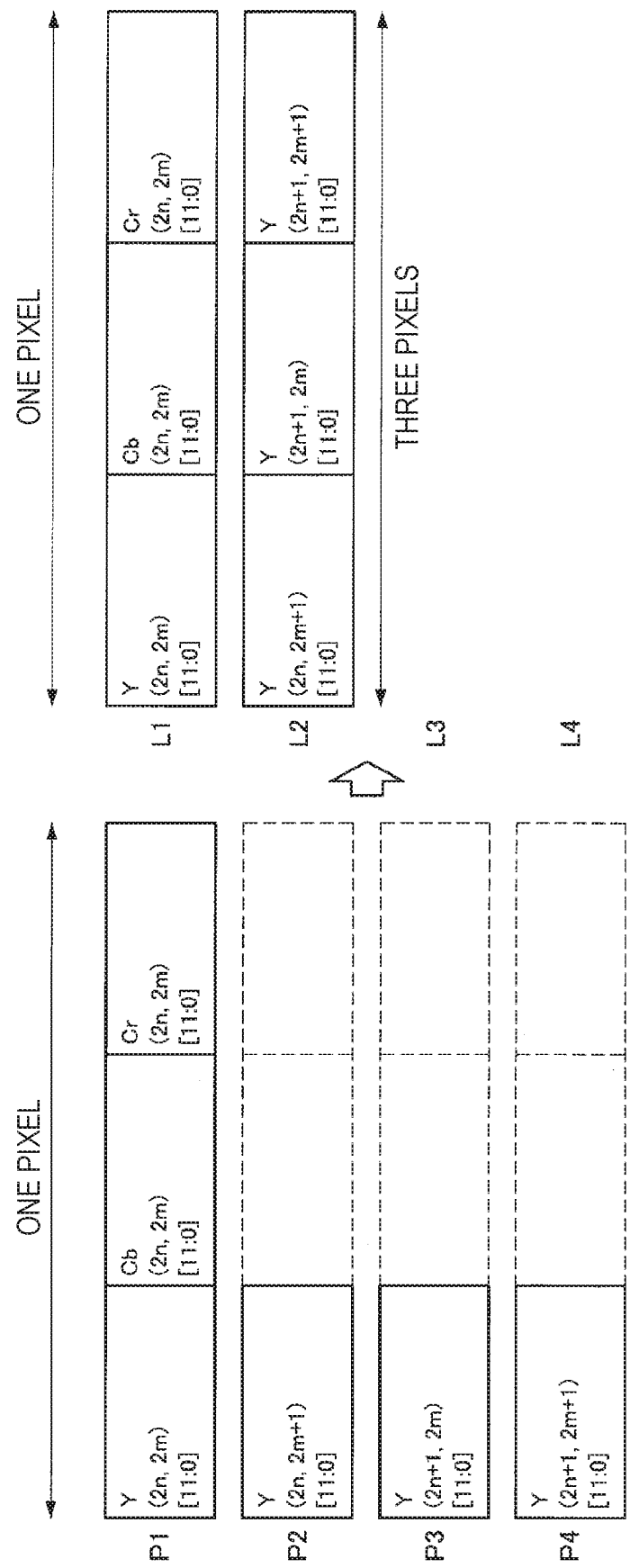

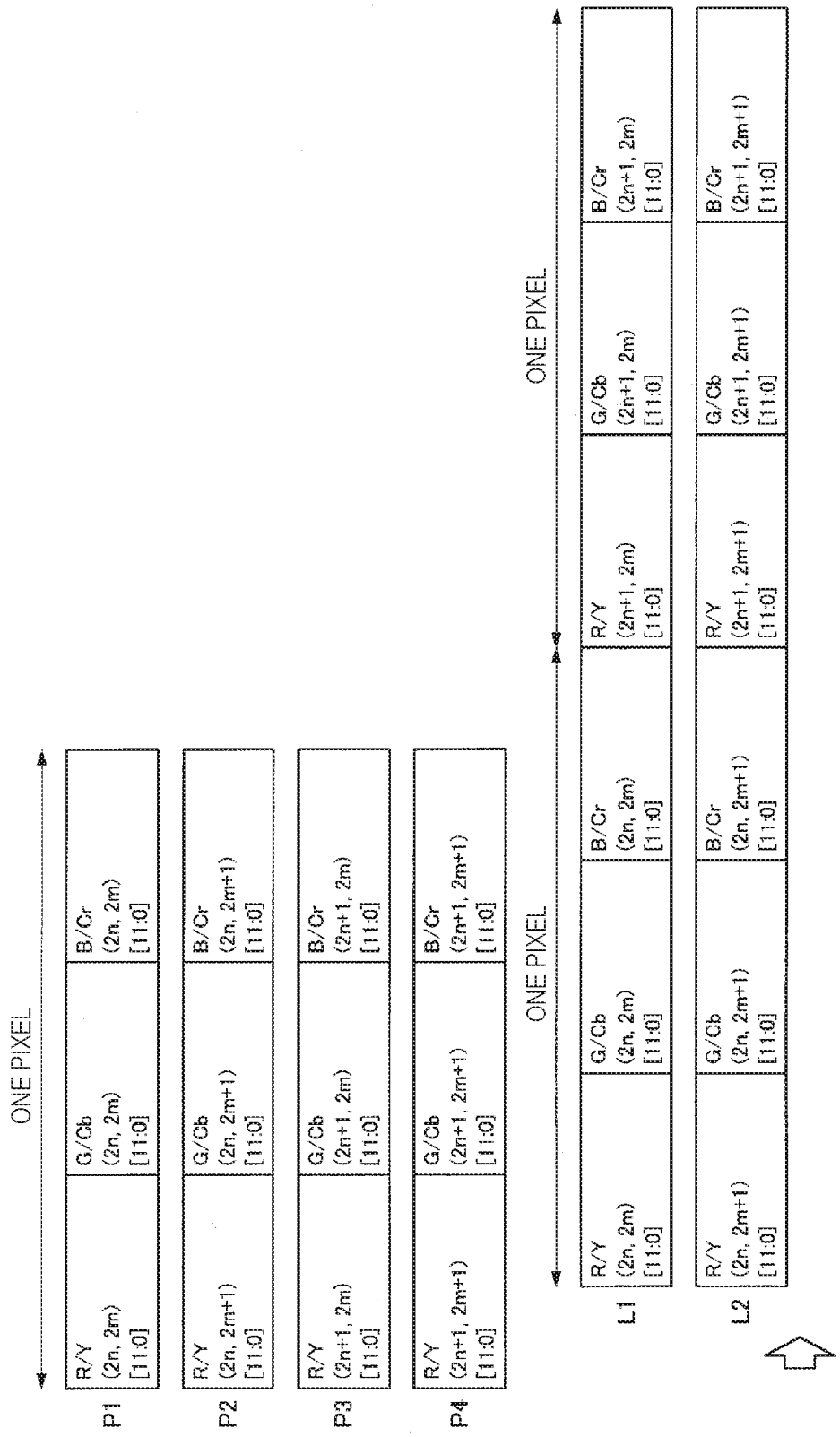

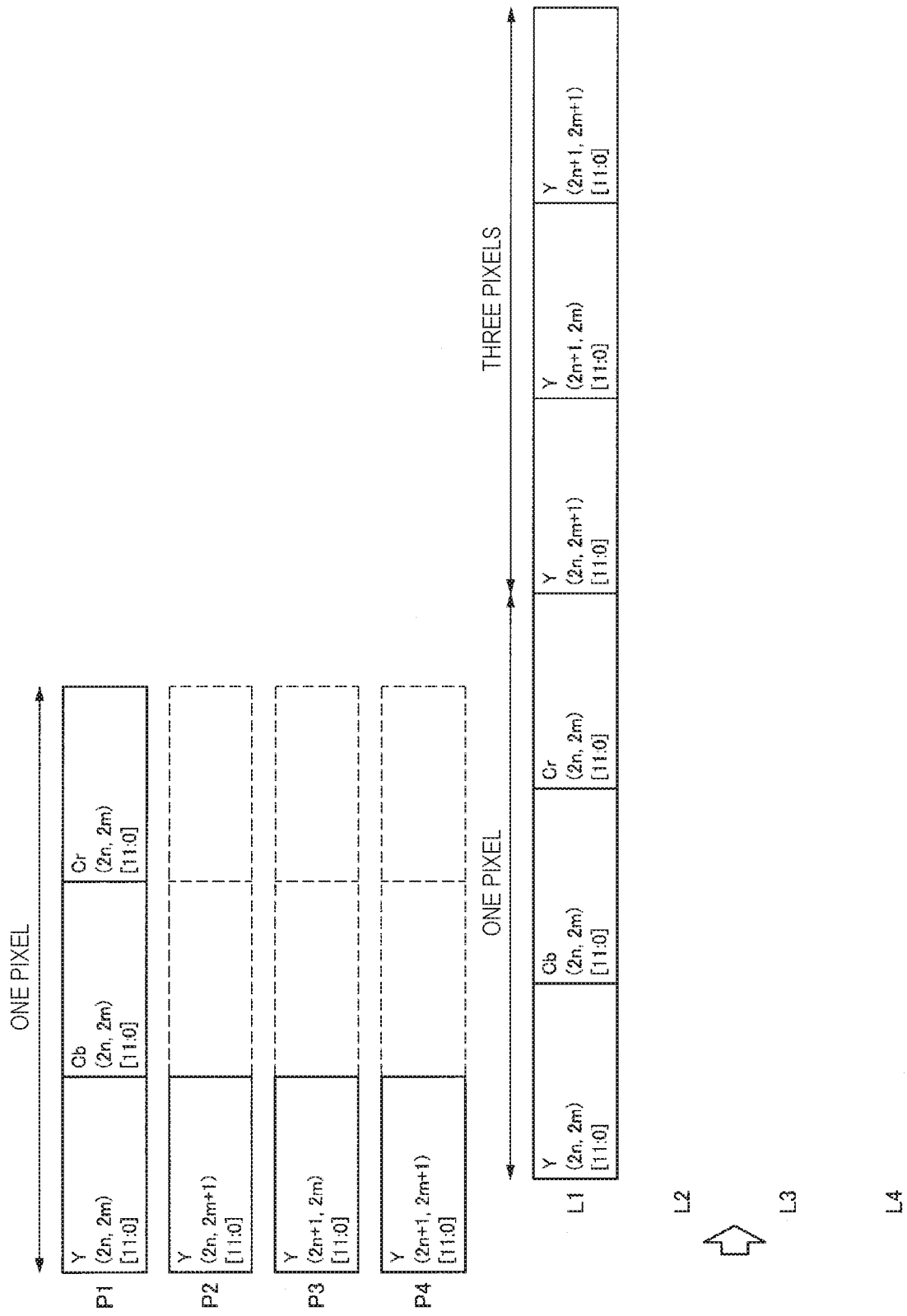

FRAME GENERATION APPARATUS, FRAME GENERATION METHOD, IMAGE RESTORATION APPARATUS, IMAGE RESTORATION METHOD, IMAGE TRANSMISSION SYSTEM, AND IMAGE TRANSMISSION METHOD

CROSS REFERENCE TO RELATED APPLICATIONS

This application is a U.S. National Phases of International Patent Application No. PCT/JP2016/0771144 filed on Sep. 14, 2016, which claims priority benefit of Japanese Patent Application No. JP 2015-236226 filed in the Japan Patent Office on Dec. 3, 2015. Each of the above-referenced applications is hereby incorporated herein by reference in its entirety.

TECHNICAL FIELD

The present disclosure relates to a frame generation apparatus, a frame generation method, an image restoration apparatus, an image restoration method, an image transmission system, and an image transmission method.

BACKGROUND ART

These days, the amount of information of a video signal is dramatically improved, and an ultra-high resolution, ultra-high gradation baseband video signal is coming into wide use. For example, Super Hi-Vision (SHV), in which the number of effective pixels is 7680×4320, is promoted; in Super Hi-Vision, the number of bits of each of pixel elements (R, G, and B, and Y, Cb, and Cr) per pixel is 10 or 12. Further, as the color format, the YCbCr420 format is becoming used in addition to already existing formats (the RGB format, the YCbCr444 format, and the YCbCr422 format).

For example, in Super Hi-Vision, in a case where the number of effective pixels is 7680×4320, the color format is RGB, the number of pixel bits is 36, and the frame rate is 120 Hz, the transmission rate is 171 Gbps. In a case where a transmitter transmits such an ultra-high speed video signal to a receiver, a technique in which the video signal is divided into a plurality of signals and each of the plurality of divided signals obtained by division is transmitted via a corresponding transmission path is used. A technology in which, in this event, the number of transmission paths used for the transmission of the plurality of divided signals is changed on the basis of the color format information of the video signal is disclosed (for example, see Non-Patent Literature 1). According to such a technology, the load on the transmission path can be reduced.

CITATION LIST

Non-Patent Literature

Non-Patent Literature 1: Association of Radio Industries and Businesses, "ARIB STD-B58, Interface for UHDTV Production Systems," (online), developed on Mar. 18, 2014, searched on Nov. 24, 2015, website: <URL:http://www.arib.or.jp/english/html/overview/doc/2-STD-B58v1_0.pdf>

DISCLOSURE OF INVENTION

Technical Problem

However, it is desired to provide a technology capable of suppressing the production cost of a system in which a video signal is transmitted via a plurality of transmission paths.

Solution to Problem

According to the present disclosure, there is provided a frame generation apparatus including: an image division section configured to, in a case where a horizontal-direction pixel number in a video signal is set to integers of 0 to N−1 and a vertical-direction line number in the video signal is set to integers of 0 to M−1, perform an operation of dividing a pixel group included in a line of which the vertical-direction line number is 2m and a pixel group included in a line of which the vertical-direction line number is (2m+1) on a basis of color format information of the video signal, for all integers m satisfying $0 \leq m \leq (M/2)-1$, and thereby obtain a plurality of divided signals; and a frame generation section configured to generate a plurality of frames individually including the plurality of divided signals.

According to the present disclosure, there is provided a frame generation method including: in a case where a horizontal-direction pixel number in a video signal is set to integers of 0 to N−1 and a vertical-direction line number in the video signal is set to integers of 0 to M−1, performing an operation of dividing a pixel group included in a line of which the vertical-direction line number is 2m and a pixel group included in a line of which the vertical-direction line number is (2m+1) on a basis of color format information of the video signal, for all integers m satisfying $0 \leq m \leq (M/2)-1$, and thereby obtaining a plurality of divided signals; and generating a plurality of frames individually including the plurality of divided signals.

According to the present disclosure, there is provided an image restoration apparatus including: a signal acquisition section configured to, if a plurality of frames individually including a plurality of divided signals obtained by performing an operation of dividing a pixel group included in a line of which a vertical-direction line number is 2m and a pixel group included in a line of which the vertical-direction line number is (2m+1) on a basis of color format information of a video signal, for all integers m satisfying $0 \leq m \leq (M/2)-1$, are received, acquire the plurality of divided signals; and an image restoration section configured to restore the video signal on a basis of the divided signals.

According to the present disclosure, there is provided an image restoration method including: if a plurality of frames individually including a plurality of divided signals obtained by performing an operation of dividing a pixel group included in a line of which a vertical-direction line number is 2m and a pixel group included in a line of which the vertical-direction line number is (2m+1) on a basis of color format information of a video signal, for all integers m satisfying $0 \leq m \leq (M/2)-1$, are received, acquiring the plurality of divided signals; and restoring the video signal on a basis of the divided signals.

According to the present disclosure, there is provided an image transmission system including: a transmitter including an image division section configured to, in a case where a horizontal-direction pixel number in a video signal is set to integers of 0 to N−1 and a vertical-direction line number in the video signal is set to integers of 0 to M−1, perform an operation of dividing a pixel group included in a line of which the vertical-direction line number is 2m and a pixel group included in a line of which the vertical-direction line number is (2m+1) on a basis of color format information of the video signal, for all integers m satisfying 0≤m≤(M/2)−1, and thereby obtain a plurality of divided signals, and a frame generation section configured to generate a plurality of frames individually including the plurality of divided signals; and a receiver including a signal acquisition section configured to acquire the plurality of divided signals if the plurality of frames are received, and an image restoration section configured to restore the video signal on a basis of the divided signals.

According to the present disclosure, there is provided an image transmission method including: in a case where a horizontal-direction pixel number in a video signal is set to integers of 0 to N−1 and a vertical-direction line number in the video signal is set to integers of 0 to M−1, performing an operation of dividing a pixel group included in a line of which the vertical-direction line number is 2m and a pixel group included in a line of which the vertical-direction line number is (2m+1) on a basis of color format information of the video signal, for all integers m satisfying 0≤m≤(M/2)−1, and thereby obtaining a plurality of divided signals; generating a plurality of frames individually including the plurality of divided signals; acquiring the plurality of divided signals if the plurality of frames are received; and restoring the video signal on a basis of the divided signals.

Advantageous Effects of Invention

As described above, according to the present disclosure, a technology capable of suppressing the production cost of a system in which a video signal is transmitted via a plurality of transmission paths is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1B is a diagram showing an example of a configuration of an image transmission system according to an embodiment of the present disclosure.

FIG. 3 is a diagram showing a detailed configuration of an image division section.

FIG. 5C is a diagram showing an example of input and output of a pixel group in a pixel element output section in a case where color format information is YCbCr420.

FIG. 6A is a diagram showing an example of input and output of a pixel group in a pixel element output section in a case where color format information is RGB or YCbCr444.

FIG. 6C is a diagram showing an example of input and output of a pixel group in a pixel element output section in a case where color format information is YCbCr420.

MODE(S) FOR CARRYING OUT THE INVENTION

Figure 1A:
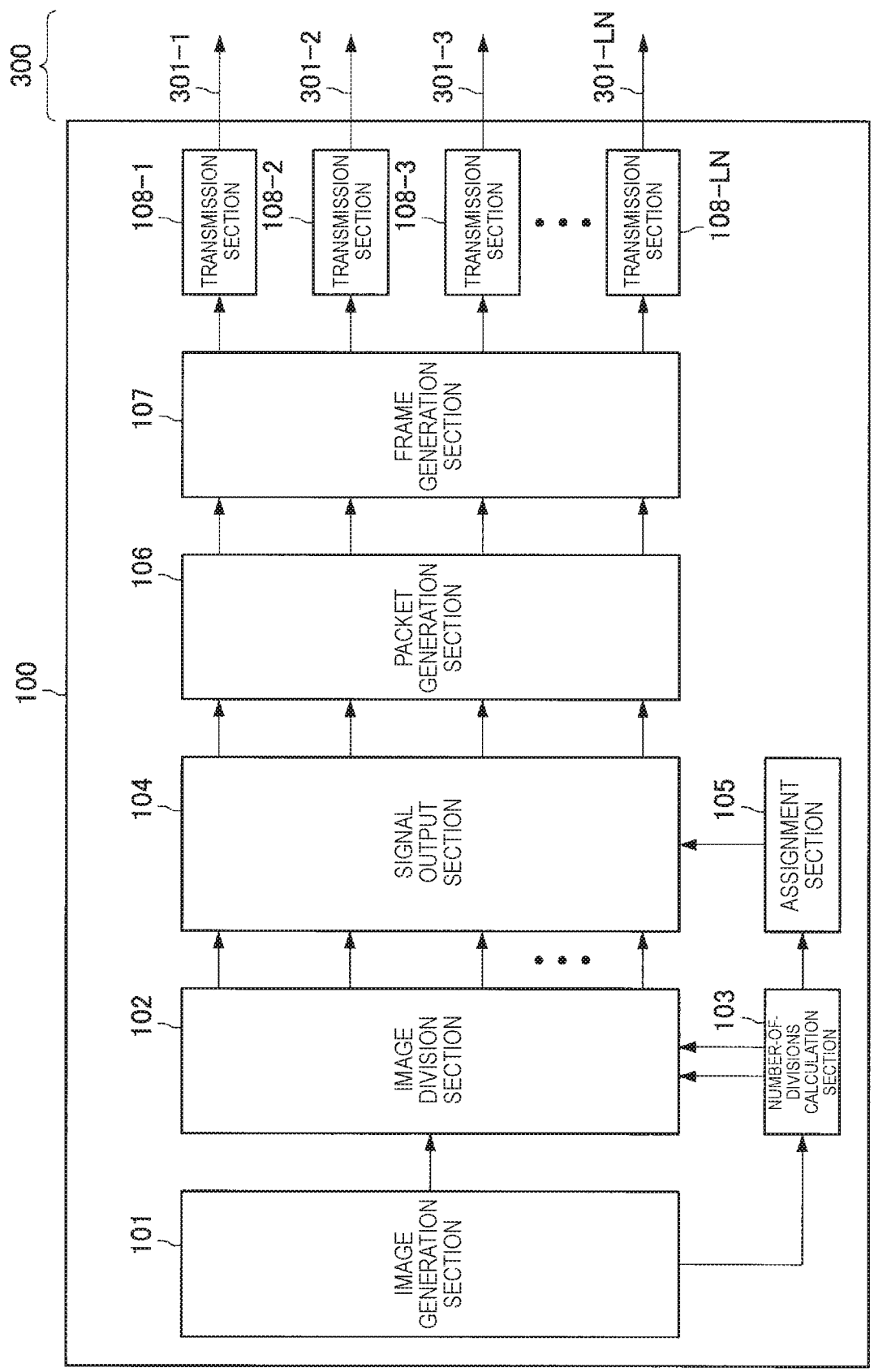
FIG. 1A is a diagram showing an example of a configuration of an image transmission system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in the present specification and the drawings, a plurality of components having substantially the same functional configuration are distinguished by marking different numerals after the same reference character. However, in a case where it is not necessary to particularly distinguish each of a plurality of components having substantially the same functional configuration and the like, they are marked with only the same reference character. Further, like components of different embodiments are distinguished by marking different alphabet letters after the same reference character.

Note that the description is given in the following order.
1. Background
2. Configurational example of image transmission system
2.1. Configurational example of transmitter
2.2. Configurational example of receiver
3. Conclusions (1. Background)

First, the background of the present embodiment is described. These days, the amount of information of a video signal is dramatically improved, and an ultra-high resolution, ultra-high gradation baseband video signal is coming into wide use. For example, Super Hi-Vision (SHV), in which the number of effective pixels is 7680×4320, is promoted; in Super Hi-Vision, the number of bits of each of pixel elements (R, G, and B, and Y, Cb, and Cr) per pixel is 10 or 12. Further, as the color format, the YCbCr420 format is becoming used in addition to already existing formats (the RGB format, the YCbCr444 format, and the YCbCr422 format).

For example, in Super Hi-Vision, in a case where the number of effective pixels is 7680×4320, the color format is RGB, the number of pixel bits is 36, and the frame rate is 120 Hz, the transmission rate is 171 Gbps. In a case where a transmitter transmits such an ultra-high speed video signal to a receiver, a technique in which the video signal is divided into a plurality of signals and each of the plurality of divided signals obtained by division is transmitted via a corresponding transmission path is used. Hereinafter, the position information of each pixel may be shown as (a horizontal-direction pixel number, a vertical-direction line number).

A technology in which, in this event, the number of transmission paths used for the transmission of the plurality of divided signals is changed on the basis of the color format information is disclosed (for example, see Non-Patent Literature 1). In such a technology, a case where the number of pixels of the video signal is 7680×4320, the number of bits per pixel is 36, and the frame rate is 120 Hz is envisaged. Further, in such a technology, TH represents the number of pixels in the horizontal direction, TL represents the number of pixels in the vertical direction, n represents an integer of 0 to (TH/4)−1, m represents an integer of 0 to (TL/4)−1, and k and l represent 16 combinations of arbitrary integers of 0 to 3.

Then, in a case where the color format information is RGB or YCbCr444, a transmitter separates the pixels of the video signal into 16 groups of (4n+k, 4m+l), and resolves each pixel into pixel elements of R, G, and B, or Y, Cb, and Cr; and thereby separates the video signal into 48 groups. Furthermore, among the 16 groups of each of R, G, and B, or Y, Cb, and Cr, the transmitter unifies the 16 groups of each of 2 pixel elements into a total of 8 groups and allows the 16 groups of 1 pixel element to remain as they are, and transmits a total of 24 groups via different transmission paths, respectively.

Further, in a case where the color format information is YCbCr422, the transmitter separates the video signal into 48 groups in a similar manner. Here, the Y element exists in all the groups, and is therefore separated into 16 groups; but each of the Cb element and the Cr element exists only in the case where the horizontal-direction pixel number is an even number, and is therefore separated into 8 (=16/2) groups. Thus, the transmitter unifies the 16 groups of the Y element into 8 groups and changes each of the Cb element and the Cr element from 8 groups to 4 groups, and transmits a total of 16 (=8+4×2) groups via different transmission paths, respectively.

Further, in a case where the color format information is YCbCr420, the transmitter separates the video signal into 48 groups in a similar manner. Here, the Y element exists in all the groups, and is therefore separated into 16 groups; but each of the Cb element and the Cr element exists only in the case where the horizontal-direction pixel number is an even number and furthermore the vertical-direction line number is an even number, and is therefore separated into 4 (=16/4) groups. Thus, the transmitter unifies the 16 groups of the Y element into 8 groups and changes each of the Cb element and the Cr element from 4 groups to 2 groups, and transmits a total of 12 (=8+2×2) groups via different transmission paths, respectively.

As described hereinabove, according to a technology in which the number of transmission paths used for the transmission of a plurality of divided signals is changed on the basis of the color format information, the load on the transmission path can be reduced. However, in such a technology, the unit of division of the video signal is (4n+k, 4m+l), and therefore a line memory for holding a pixel group of 4 lines is needed. Thus, the present specification mainly proposes a technology capable of suppressing the production cost of a system in which a video signal is transmitted via a plurality of transmission paths.

Hereinabove, the background of the present embodiment is described.

(2. Configurational Example of Image Transmission System)

Next, a configurational example of an image transmission system according to the present embodiment is described.

FIG. 1A and FIG. 1B are diagrams showing an example of the configuration of an image transmission system according to the present embodiment. As shown in FIG. 1A and FIG. 1B, the image transmission system includes a transmitter 100 and a receiver 200. The transmitter 100 and the receiver 200 are connected together via a cable 300, and the cable 300 includes transmission paths 301-1 to 301-LN (LN being an integer of more than or equal to 2). In the following, the transmission capacity per transmission path may be expressed as LC [bps].

Note that the transmitter 100 can function as a "frame generation apparatus." Further, the receiver 200 can function as an "image restoration apparatus." The transmitter 100 includes an image generation section 101, an image division section 102, a number-of-divisions calculation section 103, a signal output section 104, an assignment section 105, a packet generation section 106, a frame generation section 107, and transmission sections 108-1 to 108-LN.

(2-1. Configurational Example of Transmitter)

First, the configuration of the transmitter 100 is described. The image generation section 101 generates a video signal. In the following, the transmission rate of the video signal may be expressed as VC [bps]. Note that, although FIG. 1A shows an example in which the image generation section 101 is incorporated in the transmitter 100, the image generation section 101 may exist outside the transmitter 100. Further, although in the example shown in FIG. 1A the image generation section 101 generates one video signal, the number of video signals generated by the image generation section 101 may be plural.

Figure 2A:
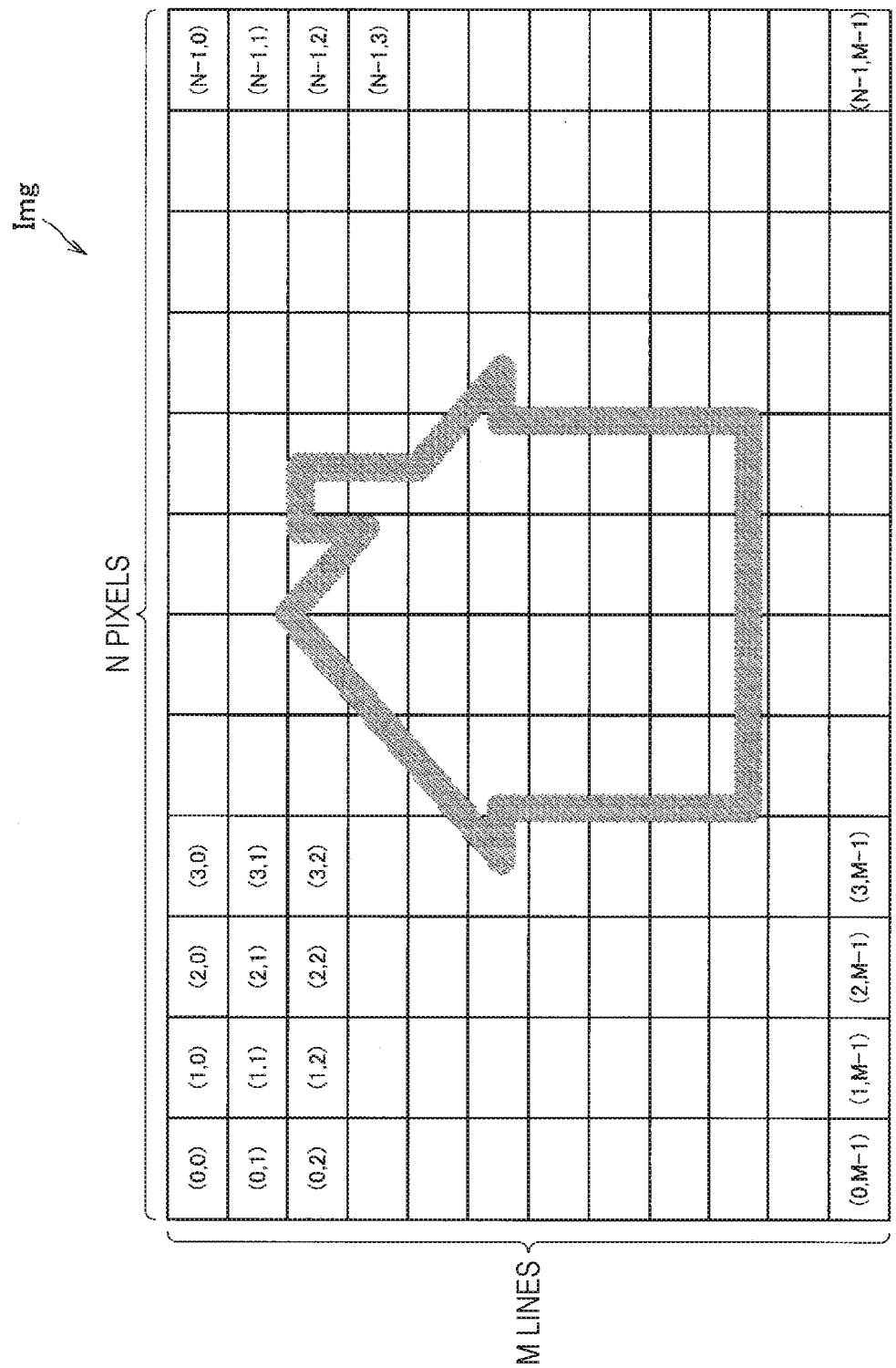
FIG. 2A is a diagram showing an example of a video signal according to the embodiment.

FIG. 2A is a diagram showing an example of the video signal according to the present embodiment. As shown in FIG. 2A, the number of pixels in the horizontal direction in a video signal Img is denoted by N, and the number of lines in the vertical direction in the video signal Img is denoted by M. That is, the horizontal-direction pixel number in the video signal Img is set to integers of 0 to N−1, and the vertical-direction line number in the video signal Img is set to integers of 0 to M−1. Note that, although the video signal Img includes a blanking section described later, the blanking section is omitted in FIG. 2A.

Figure 2B:
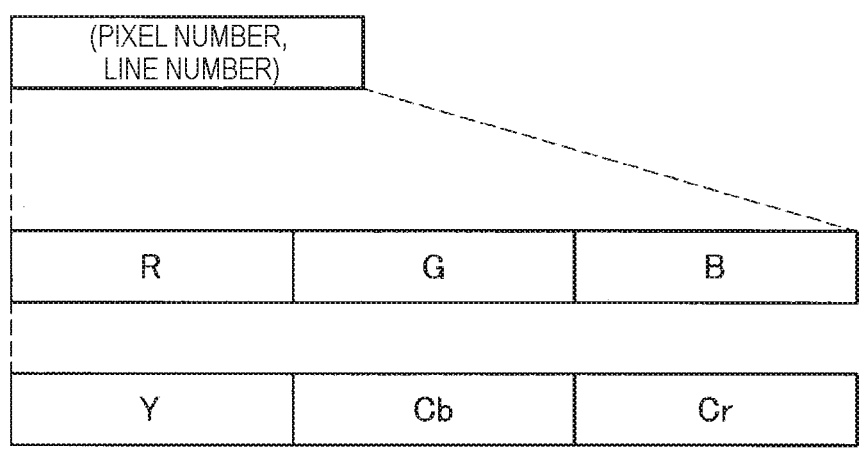
FIG. 2B is a diagram showing examples of pixel elements included in each pixel included in a video signal.

Here, the type of pixel elements included in each pixel included in the video signal Img is not particularly limited. FIG. 2B is a diagram showing examples of pixel elements included in each pixel included in the video signal Img. As shown in FIG. 2B, the type of pixel elements corresponding to each of the pixels included in the video signal Img, i.e., (the horizontal-direction pixel number, the vertical-direction line number)=(0, 0), (1, 0), (2, 0), . . . , and (n−1, m−1), may be RGB or may be YCbCr.

The number-of-divisions calculation section 103 calculates the number of divisions D of the video signal Img on the basis of the transmission capacity LC [bps] per transmission path and the transmission rate VC [bps] of the video signal Img. More specifically, the number-of-divisions calculation section 103 may calculate an integer that VC [bps]/LC [bps] does not exceed (for example, the smallest integer) as the number of divisions D. Although in the following a case of being calculated as D=2 or a multiple of 4 is mainly envisaged, D is not particularly limited as long as it is a natural number. First, a case where the number of divisions D is a multiple of 4 is described. Further, the number-of-divisions calculation section 103 may hold the transmission capacity LC [bps] per transmission path in advance, and may acquire the transmission rate VC [bps] of the video signal Img from the image generation section 101.

The color format information of the video signal Img is inputted to the image division section 102 from the image generation section 101 via an input terminal 1027. The image division section 102 performs an operation of dividing the pixel group included in a line of which the vertical-direction line number is 2m and the pixel group included in a line of which the vertical-direction line number is (2m+1) on the basis of the color format information, for all the integers m satisfying 0≤m≤(M/2)−1, and thereby obtains a plurality of divided signals. In this event, the image division section 102 divides the pixel group included in a line of which the vertical-direction line number is 2m and the pixel group included in a line of which the vertical-direction line number is (2m+1) into a prescribed number of divisions on the basis of the color format information of the video signal Img. More specifically, the image division section 102 calculates the number of divisions on the basis of the transmission capacity per transmission path and the transmission rate of the video signal Img.

Details of the image division section 102 will now be described. FIG. 3 is a diagram showing a detailed configuration of the image division section 102. As shown in FIG. 3, the image division section 102 includes a line output section 1021, a pixel output section 1022, and pixel element output sections 1023-1 to 1023-LN. The line output section 1021 includes a line memory for holding a pixel group of one line; and temporarily holds, by means of the line memory, the pixel group included in a line of which the vertical-direction line number is 2m, and outputs this pixel group along with the pixel group included in a line of which the vertical-direction line number is (2m+1) to the pixel output section 1022.

Figure 4A:
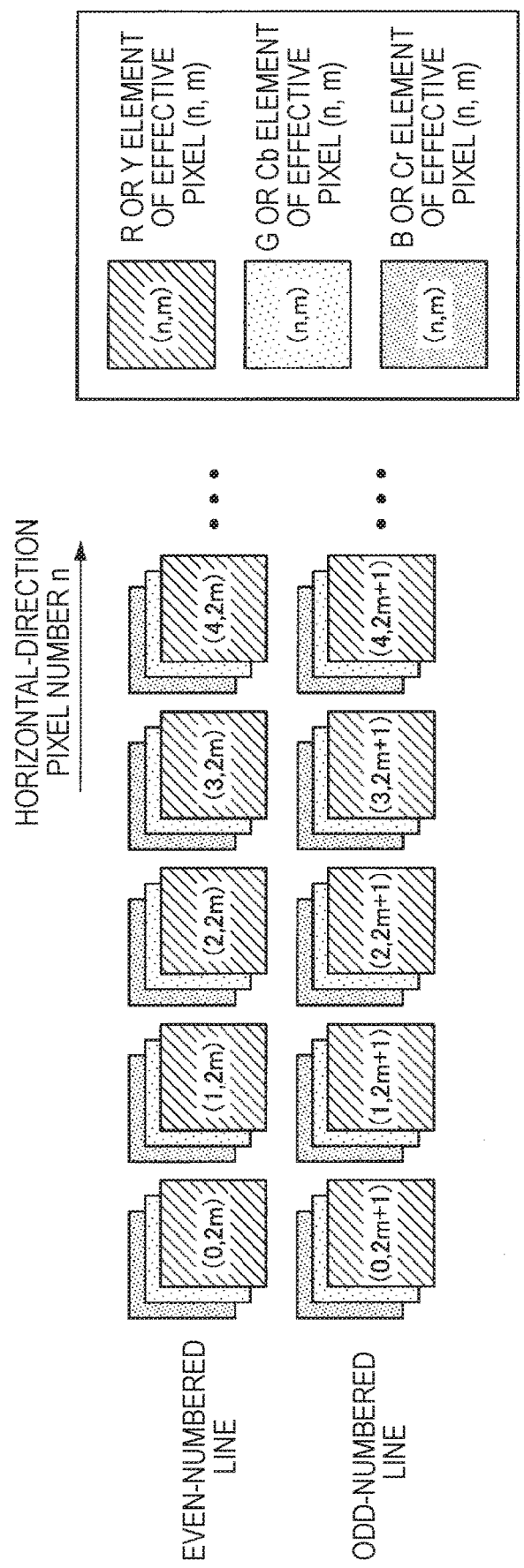
FIG. 4A is a diagram showing an example of pixel groups inputted to a pixel output section in a case where color format information is RGB or YCbCr444.

Here, examples of pixel groups inputted to the pixel output section 1022 are described. FIG. 4A is a diagram showing an example of pixel groups inputted to the pixel output section 1022 in a case where the color format information is RGB or YCbCr444. In a case where the color format information is RGB or YCbCr444, as shown in FIG. 4A, RGB or YCbCr exists in all of the pixel groups included in the even-numbered lines (lines of which the vertical-direction line number is 2m) and the pixel groups included in the odd-numbered lines (lines of which the vertical-direction line number is (2m+1)).

Figure 4B:
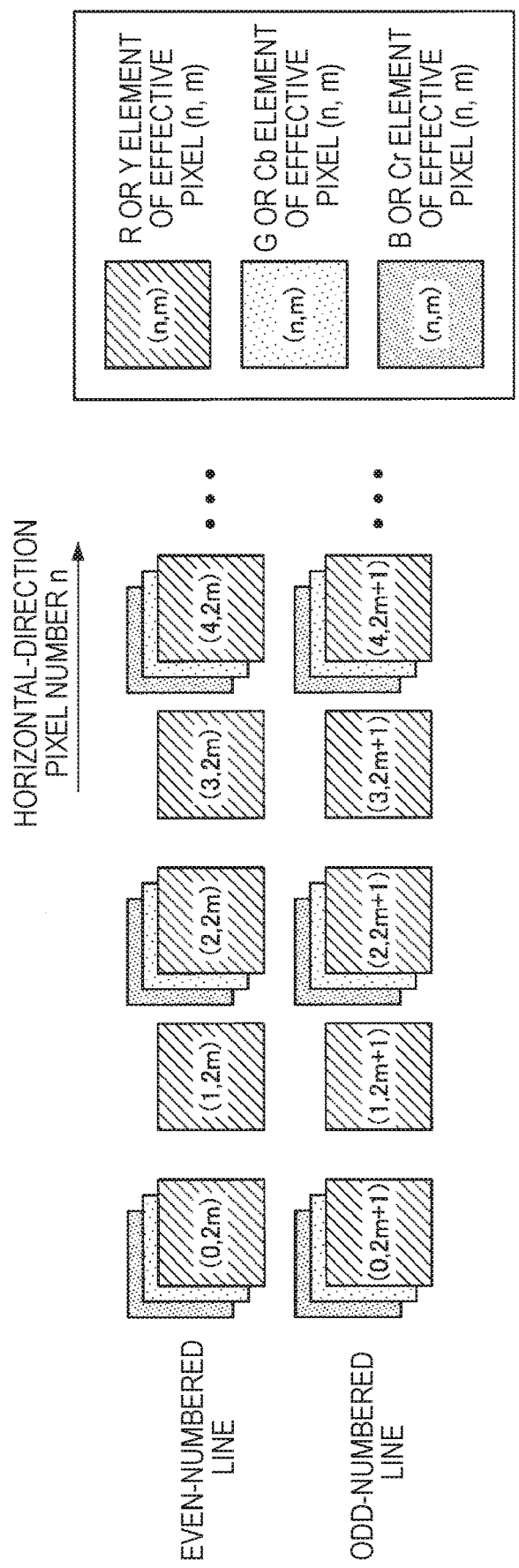
FIG. 4B is a diagram showing an example of pixel groups inputted to a pixel output section in a case where color format information is YCbCr422.

Further, FIG. 4B is a diagram showing an example of pixel groups inputted to the pixel output section 1022 in a case where the color format information is YCbCr422. In a case where the color format information is YCbCr422, as shown in FIG. 4B, Y exists in all of the pixel groups included in the even-numbered lines (lines of which the vertical-direction line number is 2m) and the pixel groups included in the odd-numbered lines (lines of which the vertical-direction line number is (2m+1)), but CbCr exists only in the case where the horizontal-direction pixel number is an even number.

Figure 4C:
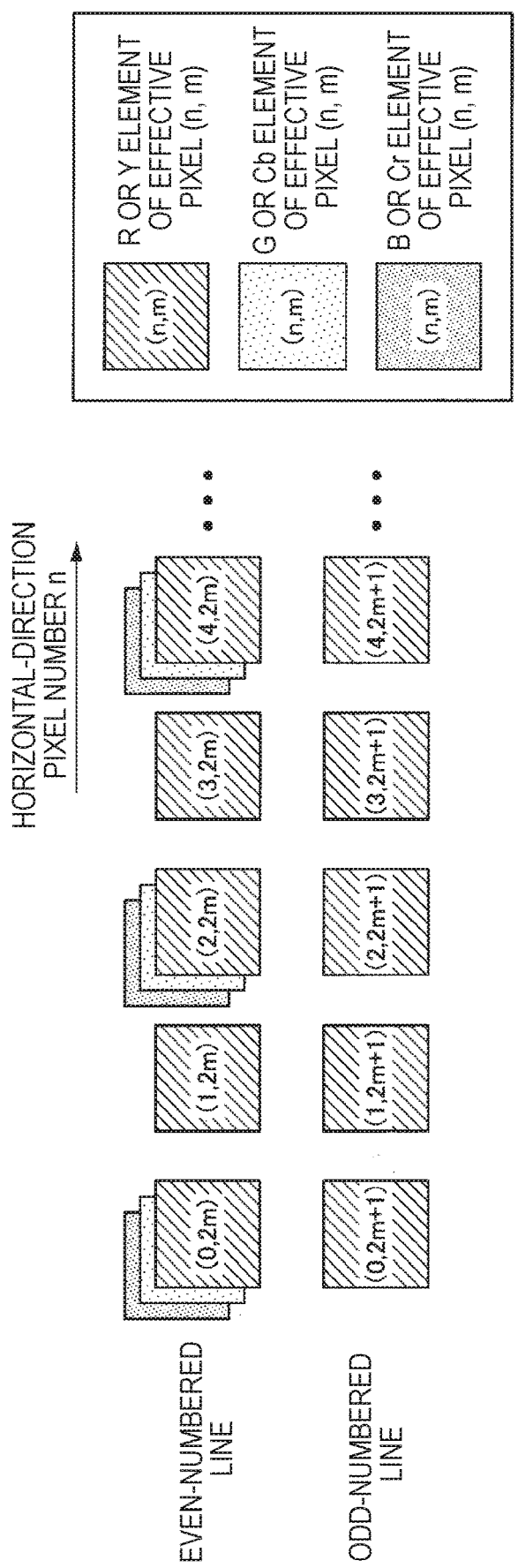
FIG. 4C is a diagram showing an example of pixel groups inputted to a pixel output section in a case where color format information is YCbCr420.

Further, FIG. 4C is a diagram showing an example of pixel groups inputted to the pixel output section 1022 in a case where the color format information is YCbCr420. In a case where the color format information is YCbCr420, as shown in FIG. 4C, Y exists in all of the pixel groups included in the even-numbered lines (lines of which the vertical-direction line number is 2m) and the pixel groups included in the odd-numbered lines (lines of which the vertical-direction line number is (2m+1)), but CbCr exists only in the case where the horizontal-direction pixel number is an even number and furthermore the vertical-direction line number is an even number.

As shown in FIGS. 4A, 4B, and 4C, Y exists in all the pixels regardless of the color format, but which pixel CbCr exists in varies with the color format. However, four pixels of (2n, 2m), (2n, 2m+1), (2n+1, 2m), and (2n+1, 2m+1) serve as one unit included in the video signal Img, regardless of the color format.

Thus, the pixel output section 1022 performs an operation of classification into any one of (the number of divisions D)/4 groups on the basis of the number of divisions D inputted from the number-of-divisions calculation section 103 via an input terminal 1026, for all the integers n satisfying 0≤n≤(N/2)−1, with four pixels of (2n, 2m), (2n, 2m+1), (2n+1, 2m), and (2n+1, 2m+1) as a pixel unit. That is, the pixel output section 1022 classifies this pixel unit into the ((n % (D/2))+1)-th group.

For example, in a case where the number of divisions D is 16, the pixel output section 1022 classifies [(0, 0), (0, 1), (1, 0), (1, 1)], [(8, 0), (8, 1), (9, 0), (9, 1)], . . . into a first group, classifies [(2, 0), (2, 1), (3, 0), (3, 1)], [(10, 0), (10, 1), (11, 0), (11, 1)], . . . into a second group, classifies [(4, 0), (4, 1), (5, 0), (5, 1)], [(12, 0), (12, 1), (13, 0), (13, 1)], . . . into a third group, and classifies [(6, 0), (6, 1), (7, 0), (7, 1)], [(14, 0), (14, 1), (15, 0), (15, 1)], . . . into a fourth group.

The pixel output section 1022 outputs the first group to the (D/4)-th group to the pixel element output sections 1023-1 to 1023-(D/4), respectively, among the pixel element output sections 1023-1 to 1023-(LN/4). Four pixels of (2n, 2m), (2n, 2m+1), (2n+1, 2m), and (2n+1, 2m+1) are inputted to input terminals P1 to P4, respectively, of each of the pixel element output sections 1023-1 to 1023-(D/4).

Each of the pixel element output sections 1023-1 to 1023-(D/4) outputs each of four pixels indicated by (2n, 2m), (2n, 2m+1), (2n+1, 2m), and (2n+1, 2m+1) that have been inputted from the pixel output section 1022 via the input terminals P1 to P4, to any of four output terminals L1 to L4, on the basis of the color format information.

Figure 5A:
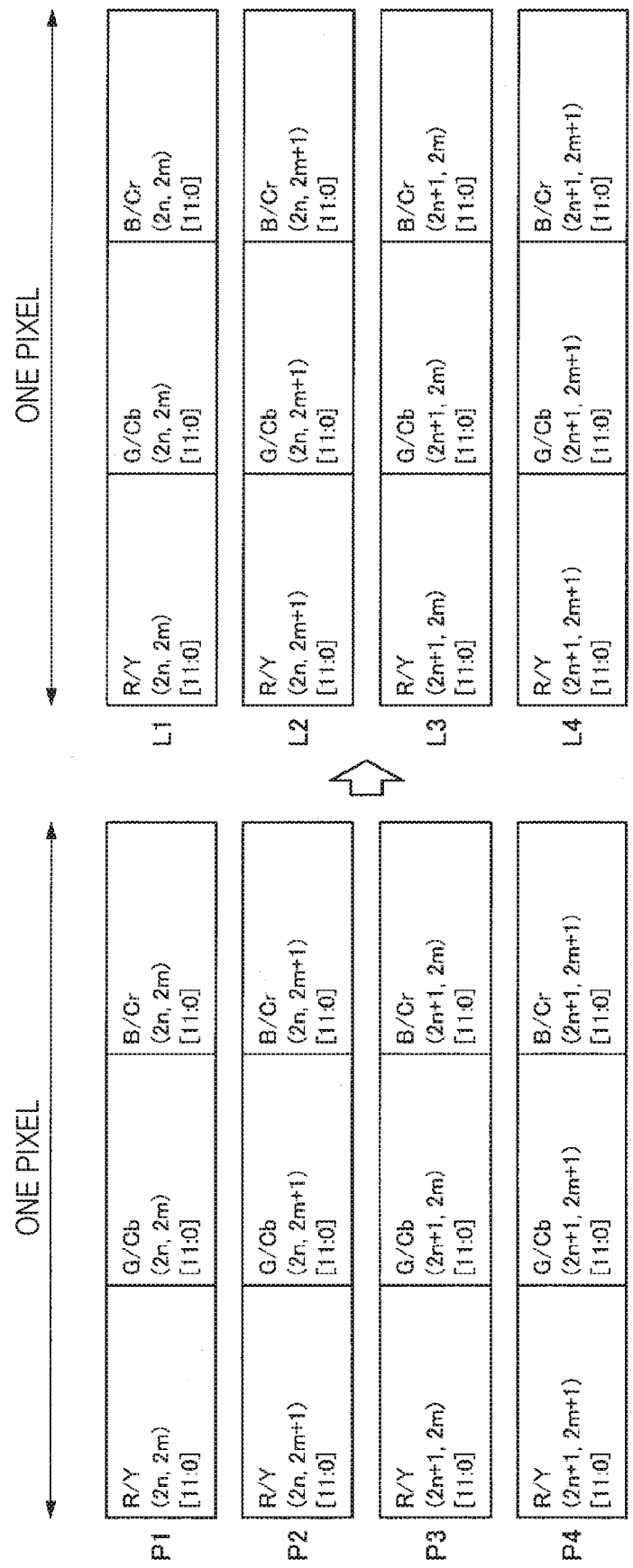
FIG. 5A is a diagram showing an example of input and output of a pixel group in a pixel element output section in a case where color format information is RGB or YCbCr444.

FIG. 5A is a diagram showing an example of the input and output of the pixel group in each of the pixel element output sections 1023-1 to 1023-(D/4) in a case where the color format information is RGB or YCbCr444. In such a case, RGB or YCbCr exists in all of the pixel groups included in the even-numbered lines and the pixel groups included in the odd-numbered lines (see FIG. 4A). Thus, in such a case, each of the pixel element output sections 1023-1 to 1023-(D/4) outputs four pixels indicated by (2n, 2m), (2n, 2m+1), (2n+1, 2m), and (2n+1, 2m+1) that have been inputted from the pixel output section 1022, to different output terminals, respectively. The output terminal is connected to the signal output section 104.

More specifically, as shown in FIG. 5A, each of the pixel element output sections 1023-1 to 1023-(D/4) outputs a pixel (RGB or YCbCr) indicated by (2n, 2m) that has been inputted from the pixel output section 1022 via the input terminal P1, to the output terminal L1. Further, as shown in FIG. 5A, each of the pixel element output sections 1023-1 to 1023-(D/4) outputs a pixel (RGB or YCbCr) indicated by (2n, 2m+1) that has been inputted from the pixel output section 1022 via the input terminal P2, to the output terminal L2.

Further, as shown in FIG. 5A, each of the pixel element output sections 1023-1 to 1023-(D/4) outputs a pixel (RGB or YCbCr) indicated by (2n+1, 2m) that has been inputted from the pixel output section 1022 via the input terminal P3, to the output terminal L3. Further, as shown in FIG. 5A, each of the pixel element output sections 1023-1 to 1023-(D/4) outputs a pixel (RGB or YCbCr) indicated by (2n+1, 2m+1) that has been inputted from the pixel output section 1022 via the input terminal P4, to the output terminal L4.

Figure 5B:
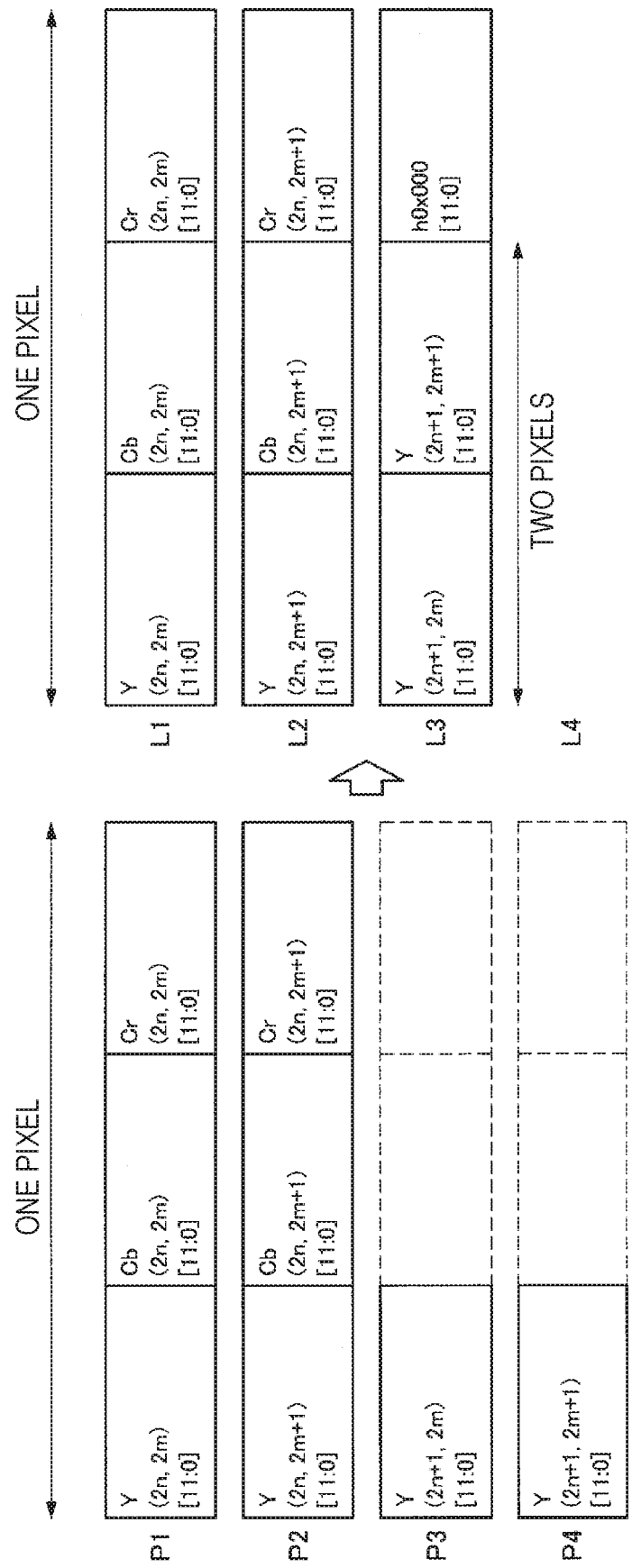
FIG. 5B is a diagram showing an example of input and output of a pixel group in a pixel element output section in a case where color format information is YCbCr422.

FIG. 5B is a diagram showing an example of the input and output of the pixel group in each of the pixel element output sections 1023-1 to 1023-(D/4) in a case where the color format information is YCbCr422. In such a case, Y exists in all of the pixel groups included in the even-numbered lines and the pixel groups included in the odd-numbered lines, but CbCr exists only in the case where the horizontal-direction pixel number is an even number (see FIG. 4B).

Thus, in such a case, each of the pixel element output sections 1023-1 to 1023-(D/4) outputs two pixels (RGB or YCbCr) indicated by (2n, 2m) and (2n, 2m+1) that have been inputted from the pixel output section 1022, to different output terminals, respectively, and outputs two pixels (Y) indicated by (2n+1, 2m) and (2n+1, 2m+1) to one and the same output terminal.

More specifically, as shown in FIG. 5B, each of the pixel element output sections 1023-1 to 1023-(D/4) outputs a pixel (YCbCr) indicated by (2n, 2m) that has been inputted from the pixel output section 1022 via the input terminal P1, to the output terminal L1. Further, as shown in FIG. 5B, each of the pixel element output sections 1023-1 to 1023-(D/4) outputs a pixel (YCbCr) indicated by (2n, 2m+1) that has been inputted from the pixel output section 1022 via the input terminal P2, to the output terminal L2.

Further, as shown in FIG. 5B, each of the pixel element output sections 1023-1 to 1023-(D/4) outputs a pixel (Y) indicated by (2n+1, 2m) that has been inputted from the pixel output section 1022 via the input terminal P3, to the output terminal L3, and outputs a pixel (Y) indicated by (2n+1, 2m+1) that has been inputted from the pixel output section 1022 via the input terminal P4, to the output terminal L4.

FIG. 5C is a diagram showing an example of the input and output of the pixel group in each of the pixel element output sections 1023-1 to 1023-(D/4) in a case where the color format information is YCbCr420. In such a case, Y exists in all of the pixel groups included in the even-numbered lines and the pixel groups included in the odd-numbered lines, but CbCr exists only in the case where the horizontal-direction pixel number is an even number and furthermore the vertical-direction line number is an even number (see FIG. 4C).

Thus, in such a case, each of the pixel element output sections 1023-1 to 1023-(D/4) outputs a pixel (RGB or YCbCr) indicated by (2n, 2m) that has been inputted from the pixel output section 1022, to a prescribed output terminal, and outputs three pixels (Y) indicated by (2n, 2m+1), (2n+1, 2m), and (2n+1, 2m+1) to one and the same output terminal.

More specifically, as shown in FIG. 5C, each of the pixel element output sections 1023-1 to 1023-(D/4) outputs a pixel (YCbCr) indicated by (2n, 2m) that has been inputted from the pixel output section 1022 via the input terminal P1, to the output terminal L1. Further, as shown in FIG. 5B, each of the pixel element output sections 1023-1 to 1023-(D/4) outputs three pixels (Y) indicated by (2n, 2m+1), (2n+1, 2m), and (2n+1, 2m+1) that have been inputted from the pixel output section 1022 via the input terminal P2, to the output terminal L2.

Next, a case where the number of divisions D is 2 is described. Also in a case where the number of divisions D is 2, an even-numbered line and an odd-numbered line are outputted to the pixel output section 1022 like in a case where the number of divisions D is a multiple of 4. In a case where the number of divisions D inputted from the number-of-divisions calculation section 103 via the input terminal 1026 is 2, the pixel output section 1022 classifies four pixels of (2n, 2m), (2n, 2m+1), (2n+1, 2m), and (2n+1, 2m+1) as a pixel unit into one group.

The pixel output section 1022 outputs one group to the pixel element output section 1023-1 among the pixel element output sections 1023-1 to 1023-(LN/4). Four pixels of (2n, 2m), (2n, 2m+1), (2n+1, 2m), and (2n+1, 2m+1) are inputted to the input terminals P1 to P4, respectively, of the pixel element output section 1023-1.

The pixel element output section 1023-1 outputs each of four pixels indicated by (2n, 2m), (2n, 2m+1), (2n+1, 2m), and (2n+1, 2m+1) that have been inputted from the pixel output section 1022 via the input terminals P1 to P4, to any of the four output terminals L1 to L4, on the basis of the color format information.

FIG. 6A is a diagram showing an example of the input and output of the pixel group in the pixel element output section 1023-1 in a case where the color format information is RGB or YCbCr444. In such a case, RGB or YCbCr exists in all of the pixel groups included in the even-numbered lines and the pixel groups included in the odd-numbered lines (see FIG. 4A). Thus, in such a case, the pixel element output section 1023-1 outputs any two of four pixels indicated by (2n, 2m), (2n, 2m+1), (2n+1, 2m), and (2n+1, 2m+1) that have been inputted from the pixel output section 1022, to one and the same output terminal, and outputs the other two to one and the same output terminal.

More specifically, as shown in FIG. 6A, the pixel element output section 1023-1 outputs a pixel (RGB or YCbCr) indicated by (2n, 2m) that has been inputted from the pixel output section 1022 via the input terminal P1, to the output terminal L1. Further, as shown in FIG. 6A, the pixel element output section 1023-1 outputs a pixel (RGB or YCbCr) indicated by (2n, 2m+1) that has been inputted from the pixel output section 1022 via the input terminal P2, to the output terminal L2.

Further, as shown in FIG. 6A, the pixel element output section 1023-1 outputs a pixel (RGB or YCbCr) indicated by (2n+1, 2m) that has been inputted from the pixel output section 1022 via the input terminal P3, to the output terminal L1. Further, as shown in FIG. 6A, the pixel element output section 1023-1 outputs a pixel (RGB or YCbCr) indicated by (2n+1, 2m+1) that has been inputted from the pixel output section 1022 via the input terminal P4, to the output terminal L2.

Figure 6B:
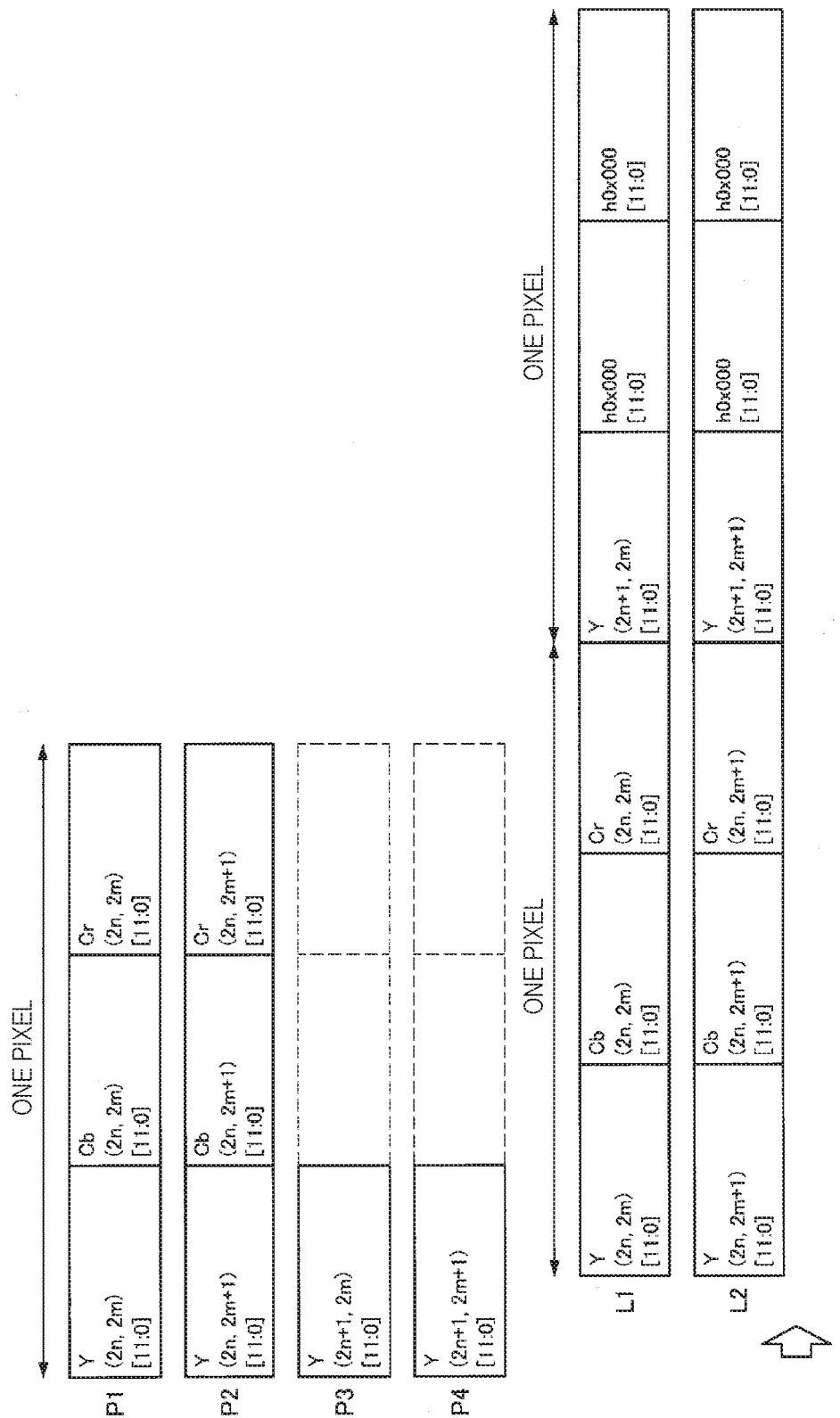
FIG. 6B is a diagram showing an example of input and output of a pixel group in a pixel element output section in a case where color format information is YCbCr422.

FIG. 6B is a diagram showing an example of the input and output of the pixel group in the pixel element output section 1023-1 in a case where the color format information is YCbCr422. In such a case, Y exists in all of the pixel groups included in the even-numbered lines and the pixel groups included in the odd-numbered lines, but CbCr exists only in the case where the horizontal-direction pixel number is an even number (see FIG. 4B). Thus, in such a case, the pixel element output section 1023-1 outputs two pixels indicated by (2n, 2m) and (2n+1, 2m) that have been inputted from the pixel output section 1022, to one and the same output terminal, and outputs two pixels indicated by (2n, 2m+1) and (2n+1, 2m+1) to one and the same output terminal.

More specifically, as shown in FIG. 6B, the pixel element output section 1023-1 outputs a pixel (RGB or YCbCr) indicated by (2n, 2m) that has been inputted from the pixel output section 1022 via the input terminal P1 and a pixel (Y) indicated by (2n+1, 2m) that has been inputted from the pixel output section 1022 via the input terminal P3, to one and the same output terminal L1. Further, as shown in FIG. 6B, the pixel element output section 1023-1 outputs a pixel (RGB or YCbCr) indicated by (2n, 2m+1) that has been inputted from the pixel output section 1022 via the input terminal P2 and a pixel (Y) indicated by (2n+1, 2m+1) that has been inputted from the pixel output section 1022 via the input terminal P4, to one and the same output terminal L2.

FIG. 6C is a diagram showing an example of the input and output of the pixel group in the pixel element output section 1023-1 in a case where the color format information is YCbCr420. In such a case, Y exists in all of the pixel groups included in the even-numbered lines and the pixel groups included in the odd-numbered lines, but CbCr exists only in the case where the horizontal-direction pixel number is an even number and furthermore the vertical-direction line number is an even number (see FIG. 4C). Thus, in such a case, the pixel element output section 1023-1 outputs four pixels indicated by (2n, 2m), (2n, 2m+1), (2n+1, 2m), and (2n+1, 2m+1) that have been inputted from the pixel output section 1022, to one and the same output terminal.

More specifically, as shown in FIG. 6C, the pixel element output section 1023-1 outputs a pixel (RGB or YCbCr) indicated by (2n, 2m) that has been inputted from the pixel output section 1022 via the input terminal P1, a pixel (Y) indicated by (2n, 2m+1) that has been inputted via the input terminal P2, a pixel (Y) indicated by (2n+1, 2m) that has been inputted via the input terminal P3, and a pixel (Y) indicated by (2n+1, 2m+1) that has been inputted from the pixel output section 1022 via the input terminal P4, to one and the same output terminal L1.

Each of the pixel rows outputted to the output terminals L1 to L4 is outputted as a divided signal to the signal output section 104. The assignment section 105 assigns a different transmission path 301 to a divided signal outputted from each of the output terminals L1 to L4, on the basis of the number of divisions D. Furthermore, the assignment section 105 controls the signal output section 104 so as to output each of the plurality of divided signals to a lane leading to the transmission path 301 assigned to each of the plurality of divided signals.

The signal output section 104 outputs each of the plurality of divided signals to the lane leading to the transmission path 301 assigned to that divided signal, in accordance with control by the assignment section 105. The packet generation section 106 partitions each of the plurality of divided signals into prescribed packet units and thereby packetizes each of the plurality of divided signals, and outputs the packets to the frame generation section 107. The frame generation section 107 generates a plurality of frames that individually include a plurality of divided signals inputted from the packet generation section 106. Here, a configurational example of the frame generated by the frame generation section 107 is described.

Figure 7:
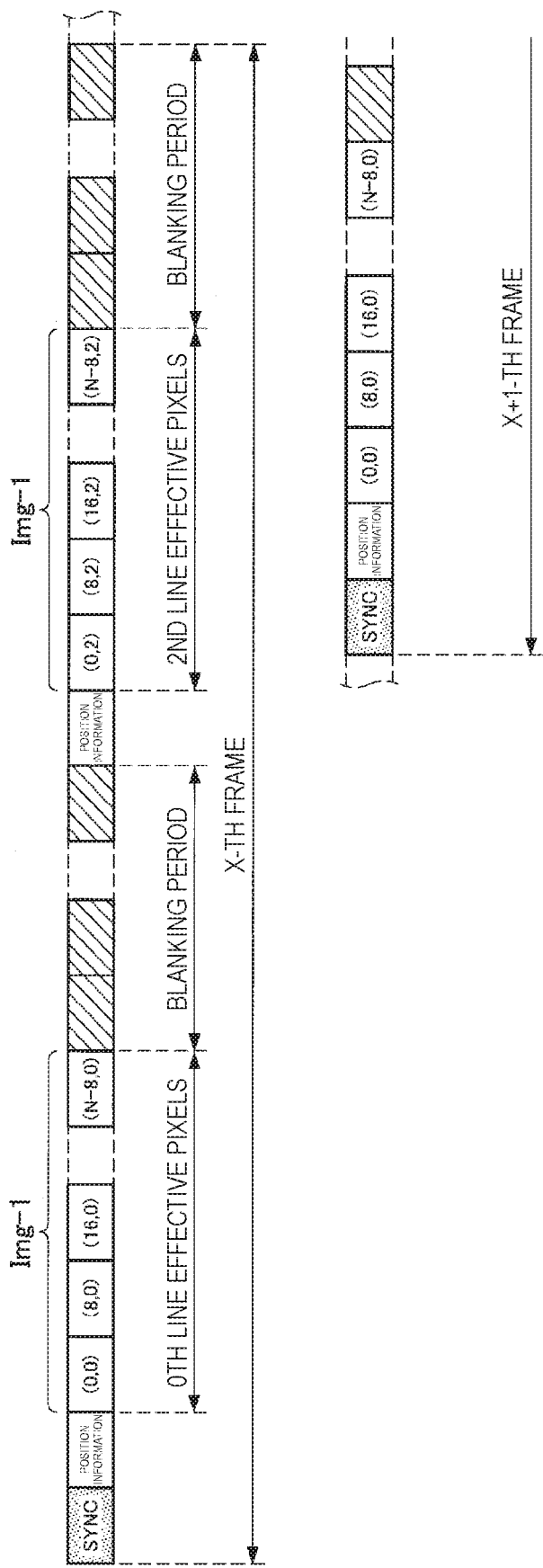
FIG. 7 is a diagram showing a configurational example of a frame generated by a frame generation section.

FIG. 7 is a diagram showing a configurational example of the frame generated by the frame generation section 107. Herein, as shown in FIG. 7, a pixel row (2n, 2m) that is divided from the video signal Img and is outputted from the output terminal L1 in a case where the number of divisions D of the video signal Img is 16 is referred to as a divided signal Img-1. However, the number of divisions D of the video signal Img is not particularly limited. Further, although in the following the divided signal Img-1 is mainly described, also a pixel row outputted from each of the output terminals L2 to L4 can be described similarly to the pixel row outputted from the output terminal L1.

In FIG. 7, the whole of the N-th frame is shown as the N-th (N being an integer more than or equal to 0) frame, and a part of the N+1-th frame is shown as the N+1-th frame. As shown in FIG. 7, the frame generation section 107 generates a frame that includes, in order, the front-end line of the divided signal Img-1 (the 0th line in the video signal Img), the second line of the divided signal Img-1 (the 8th line in the video signal Img), and the lines following the above lines of the divided signal Img-1.

Further, as shown in FIG. 7, the frame generation section 107 marks a frame start identifier (SYNC) on the head of the frame. Any one of prescribed codes at least not existing in the video signal (hereinafter, occasionally referred to as "special data") is assigned to the frame start identifier. For example, the special data depend on the encoding of data transmitted and received through the transmission path 301. For example, in a case where ANSI 8b/10b conversion is used for the encoding of data transmitted and received through the transmission path 301, a K code may be assigned to the special data. For example, data in which a K code called K28.5 (0xBC) appears consecutively N bytes may be assigned to the frame start identifier.

Referring to FIG. 7, a blanking section is inserted on the rear side of each line of the divided signal. Among the special data, special data different from the special data assigned to the frame start identifier are assigned to the blanking section.

Further, the frame generation section 107 marks, on a prescribed position of the frame, the position information in the video signal Img (the horizontal-direction pixel number, the vertical-direction line number) of the head pixel of each line of the divided signal Img-1. For example, in the example shown in FIG. 7, the frame start identifier or the blanking section exists on the front side of each line of the divided signal Img-1 of the frame. Here, among the special data, special data different from the special data assigned to the frame start identifier are assigned to the blanking section. Thus, the frame generation section 107 marks the position information on a prescribed position with respect to the position of the frame start identifier or the blanking section as a reference.

Note that the frame generation section 107 may perform encoding on the frame. Specifically, the frame generation section 107 may perform 8b/10b encoding on the frame. For example, the frame generation section 107 may substitute the frame start identifier of the frame with corresponding special data, substitute the blanking section with corresponding special data, and substitute data other than these with 10-bit-based data. Further, the frame generation section 107 may convert the encoded frame from parallel data to serial data in order to change the frame to a form suitable for high-speed transmission.

The transmission section 108 transmits a frame inputted from a lane connecting the signal output section 104 and the transmission section 108 to the receiver 200 via the transmission path 301. For example, the transmission path 301-1 is assigned to the divided signal Img-1, and a frame including the divided signal Img-1 is inputted to the transmission section 108-1 from a lane connecting the signal output section 104 and transmission section 108-1; thus, the transmission section 108-1 transmits the frame including the divided signal Img-1 to the receiver 200 via the transmission path 301-1.

For example, in a case where the transmission path 301 includes an optical fiber, the transmission section 108 includes a laser diode (LD) and a laser diode driver (LDD); and transmits a frame generated by the frame generation section 107 to the receiver 200 via the transmission path 301 after converting the frame to an optical signal with the LD driven by the LDD. However, the type of the signal transmitted from the transmitter 100 to the receiver 200 via the transmission path 301 is not limited. For example, the transmission section 108 may include a transmission device of electrical signals, and may transmit the frame to the receiver 200 via the transmission path 301 by means of an electrical signal, using the transmission device of electrical signals.

(2-2. Configurational Example of Receiver)

Next, the configuration of the receiver 200 is described. The reception section 208 receives a frame transmitted from the transmission section 108, via the transmission path 301. For example, a reception section 208-1 receives a frame transmitted from the transmission section 108-1, via the transmission path 301-1. Further, a reception section 208-2 receives a frame transmitted from the transmission section 108-2, via the transmission path 301-2. Further, a reception section 208-LN receives a frame transmitted from the transmission section 108-LN, via the transmission path 301-LN.

For example, in a case where the transmission path 301 includes an optical fiber, the reception section 208 includes a photodetector (PD) and an amplifier; and uses the amplifier to amplify a frame that is transmitted by an optical signal from the transmitter 100, and uses the PD to receive the amplified frame and convert the frame to an electrical signal. For example, the amplifier obtains a voltage signal by performing impedance conversion on a current signal, and then performs amplitude amplification on the voltage signal. However, as mentioned above, the type of the signal transmitted from the transmitter 100 to the receiver 200 via the transmission path 301 is not limited. For example, the reception section 208 may include a reception device of electrical signals, and may receive the frame from the transmitter 100 via the transmission path 301 by means of an electrical signal, using the reception device of electrical signals.

Before extracting various pieces of identification information from the frame received by the reception section 208, an identification information extraction section 207 may convert each frame received by the reception section 208 from serial data to parallel data, and may decode the frame converted to parallel data. Specifically, the identification information extraction section 207 may perform 8b/10b decoding on each frame received by the reception section 208.

For example, the identification information extraction section 207 may substitute, of each frame received by the reception section 208, the special data corresponding to the frame start identifier (SYNC) with the frame start identifier (SYNC), and substitute the special data corresponding to the blanking section with the blanking section. On the other hand, the identification information extraction section 207 may substitute also the remaining data of each frame received by the reception section 208 with 8-bit-based data.

Subsequently, the identification information extraction section 207 extracts the frame start identifier from the frame received by the reception section 208. Then, the identification information extraction section 207 extracts, from the frame, the position information marked on the prescribed position of the frame, on the basis of the position of the frame start identifier. For example, as shown in FIG. 7, the frame start identifier or the blanking section exists on the front side of each line of the divided signal Img-1 of the frame. Thus, the identification information extraction section 207 extracts the position information in the video signal Img of the head pixel of each line of the divided signal from the prescribed position with respect to the frame start identifier or the blanking section as a reference.

Further, the identification information extraction section 207 extracts the packetized divided signal from the frame received by the reception section 208. For example, the identification information extraction section 207 extracts the packetized divided signal from the frame on the basis of the position of the frame start identifier that is marked on the head of the frame received by the reception section 208. More specifically, if the identification information extraction section 207 has grasped the relative position of the divided signal with respect to the position of the frame start identifier as a reference, the identification information extraction section 207 may extract the packetized divided signal on the basis of this relative position.

The packetized divided signal is outputted to a signal acquisition section 206 by the identification information extraction section 207. The signal acquisition section 206 acquires the divided signal on the basis of the video packets generated by the divided signal being packetized. More specifically, the divided signal is restored by releasing the packetization on the divided signal (the separator between packet units). The divided signal is outputted to a signal output section 204.

A restoration control section 203 controls an image restoration section 202 so as to restore the video signal Img by synthesizing the plurality of divided signals. For example, the restoration control section 203 controls the image restoration section 202 so as to restore the video signal Img by synthesizing the plurality of divided signals on the basis of the position information in the video signal Img of the head pixel of each line of the divided signal inputted from the identification information extraction section 207. Alternatively, in a case where the restoration control section 203 has received a notification of the number of divisions D from the transmitter 100, the restoration control section 203 may grasp the position information of each pixel of the divided signal included in each frame on the basis of the number of divisions D.

The image restoration section 202 restores the video signal Img on the basis of the plurality of divided signals. Specifically, the image restoration section 202 restores the video signal Img by synthesizing the divided signal included in each frame in accordance with control by the restoration control section 203.

An image display section 201 displays a video image on the basis of the video signal Img. Specifically, the image display section 201 reproduces a video signal #1 and displays a video image, and reproduces the video signal Img and displays a video image. The image display section 201 may be, for example, display devices such as a liquid crystal display (LCD), a plasma display panel (PDP), an organic electro-luminescence (EL) display, and a projector, and the like. Note that, although FIG. 1B shows an example in which the image display section 201 is incorporated in the receiver 200, the image display section 201 may exist outside the receiver 200.

(3. Conclusions)

As described hereinabove, according to an embodiment of the present disclosure, the frame generation apparatus 100 including the image division section 102 that, in a case where the horizontal-direction pixel number in the video signal Img is set to integers of 0 to N−1 and the vertical-direction line number in the video signal Img is set to integers of 0 to M−1, performs an operation of dividing the pixel group included in a line of which the vertical-direction line number is 2m and the pixel group included in a line of which the vertical-direction line number is (2m+1) on the basis of the color format information of the video signal Img, for all the integers m satisfying $0 \leq m \leq (M/2)-1$, and thereby obtains a plurality of divided signals, and the frame generation section 107 that generates a plurality of frames individually including a plurality of divided signals is provided.

In such a configuration, the image division section 102 includes a line memory for holding a pixel group of one line; the line memory may temporarily hold the pixel group included in a line of which the vertical-direction line number is an even number, and output this pixel group along with the pixel group included in a line of which the vertical-direction line number is an odd number. Thus, it becomes possible to suppress the production cost of an image transmission system in which the video signal Img is transmitted via the plurality of transmission paths 301-1 to 301-LN.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above, the image division section 102, the packet generation section 106, and the frame generation section 107 are shared between all the transmission sections 108-1 to 108-LN; but the image division section 102, the packet generation section 106, and the frame generation section 107 may be provided individually for each of the transmission sections 108-1 to 108-LN.

Similarly, in the above, the identification information extraction section 207 and the signal acquisition section 206 are shared between all the reception sections 208-1 to 208-LN; but the identification information extraction section 207 and the signal acquisition section 206 may be provided individually for each of the reception sections 208-1 to 208-4.

Further, the receiver 200 may grasp a transmission path 301 through which a frame is not transmitted. For example, a transmission path 301 through which a frame is not transmitted may be notified from the transmitter 100 to the receiver 200 in advance. Alternatively, the receiver 200 may grasp the transmission path 301 connected to a reception section 208 that does not receive a frame in which substantial content is described, as a transmission path 301 through which a frame is not transmitted.

In this event, the receiver 200 may cause the operation of the reception section 208 connected to the transmission path 301 through which a frame is not transmitted to stop. Further, also a case where, like the above, the identification information extraction section 207 and the signal acquisition section 206 are provided individually for each of the reception sections 208-1 to 208-LN is envisaged. In such a case, the receiver 200 may cause the operation of the packet generation section 106 and the frame generation section 107 corresponding to the transmission path 301 through which a frame is not transmitted to stop.

Further, for example, each of the image generation section 101, the image division section 102, the number-of-divisions calculation section 103, the assignment section 105, the packet generation section 106, and the frame generation section 107 may be mounted on a separate integrated circuit (IC), or a combination of any two or more of these may be mounted on the same IC. Further, for example, each of the identification information extraction section 207, the signal acquisition section 206, the restoration control section 203, and the image restoration section 202 may be mounted on a separate IC, or a combination of any two or more of these may be mounted on the same IC.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A frame generation apparatus including:

an image division section configured to, in a case where a horizontal-direction pixel number in a video signal is set to integers of 0 to N−1 and a vertical-direction line number in the video signal is set to integers of 0 to M−1, perform an operation of dividing a pixel group included in a line of which the vertical-direction line number is 2m and a pixel group included in a line of which the vertical-direction line number is (2m+1) on a basis of color format information of the video signal, for all integers m satisfying $0 \leq m \leq (M/2)-1$, and thereby obtain a plurality of divided signals; and a frame generation section configured to generate a plurality of frames individually including the plurality of divided signals.

(2)

The frame generation apparatus according to (1), in which the frame generation section marks a frame start identifier on a head of the frame.

(3)

The frame generation apparatus according to (2), in which the frame generation section marks position information in the video signal of a head pixel of each line of the divided signal, on a prescribed position of the frame.

(4)

The frame generation apparatus according to (3), in which the frame start identifier or a blanking section to be substituted with a prescribed code at least not existing in the video signal exists on a front side of each line of the divided signal of the frame, and the frame generation section marks the position information on the prescribed position with respect to a position of the frame start identifier or the blanking section as a reference.

(5)

The frame generation apparatus according to any one of (1) to (4), in which the image division section divides a pixel group included in a line of which the vertical-direction line number is 2m and a pixel group included in a line of which the vertical-direction line number is (2m+1) into a prescribed number of divisions.

(6)

The frame generation apparatus according to (5), including:

a number-of-divisions calculation section configured to calculate the number of divisions on a basis of a transmission capacity per transmission path and a transmission rate of the video signal.

(7)

The frame generation apparatus according to (5) or (6), in which, in a case where the number of divisions is a multiple of 4, the image division section outputs four pixels indicated by (the horizontal-direction pixel number, the vertical-direction line number)=(2n, 2m), (2n, 2m+1), (2n+1, 2m), and (2n+1, 2m+1) to different lanes, respectively, in a case where the color format information is RGB or YCbCr444, outputs two pixels indicated by (2n, 2m) and (2n, 2m+1) to different lanes, respectively, and outputs two pixels indicated by (2n+1, 2m) and (2n+1, 2m+1) to one and the same lane in a case where the color format information is YCbCr422, and outputs a pixel indicated by (2n, 2m) to a prescribed lane and outputs three pixels indicated by (2n, 2m+1), (2n+1, 2m), and (2n+1, 2m+1) to one and the same lane in a case where the color format information is YCbCr420.

(8)

The frame generation apparatus according to (5) or (6), in which, in a case where the number of divisions is 2, the image division section outputs any two of four pixels indicated by (the horizontal-direction pixel number, the vertical-direction line number)=(2n, 2m), (2n, 2m+1), (2n+1, 2m+1), and (2n+1, 2m) to one and the same lane and outputs other two to one and the same lane in a case where the color format information is RGB or YCbCr444, outputs two pixels indicated by (2n, 2m) and (2n+1, 2m) to one and the same lane and outputs two pixels indicated by (2n, 2m+1) and (2n+1, 2m+1) to one and the same lane, or outputs two pixels indicated by (2n, 2m) and (2n+1, 2m+1) to one and the same lane and outputs two pixels indicated by (2n, 2m+1) and (2n+1, 2m) to one and the same lane in a case where the color format information is YCbCr422, and outputs four pixels indicated by (2n, 2m), (2n, 2m+1), (2n+1, 2m), and (2n+1, 2m+1) to one and the same lane in a case where the color format information is YCbCr420.

(9)

A frame generation method including:

in a case where a horizontal-direction pixel number in a video signal is set to integers of 0 to N−1 and a vertical-direction line number in the video signal is set to integers of 0 to M−1, performing an operation of dividing a pixel group included in a line of which the vertical-direction line number is 2m and a pixel group included in a line of which the vertical-direction line number is (2m+1) on a basis of color format information of the video signal, for all integers m satisfying 0≤m≤(M/2)−1, and thereby obtaining a plurality of divided signals; and generating a plurality of frames individually including the plurality of divided signals.

(10)

An image restoration apparatus including:

a signal acquisition section configured to, if a plurality of frames individually including a plurality of divided signals obtained by performing an operation of dividing a pixel group included in a line of which a vertical-direction line number is 2m and a pixel group included in a line of which the vertical-direction line number is (2m+1) on a basis of color format information of a video signal, for all integers m satisfying 0≤m≤(M/2)−1, are received, acquire the plurality of divided signals; and an image restoration section configured to restore the video signal on a basis of the divided signals.

(11)

The image restoration apparatus according to (10), in which the signal acquisition section acquires the divided signal on a basis of a position of a frame start identifier.

(12)

The image restoration apparatus according to (10) or (11), in which the image restoration section restores the video signal on a basis of position information in the video signal of a head pixel of each line of the divided signal marked on a prescribed position of the frame.

(13)

The image restoration apparatus according to (12), in which a frame start identifier or a blanking section exists on a front side of each line of the divided signal of the frame, and the image restoration section restores the video signal on a basis of the position information marked on a prescribed position with respect to a position of the frame start identifier or the blanking section as a reference.

(14)

The image restoration apparatus according to any one of (10) to (13), in which the signal acquisition section acquires the plurality of divided signals obtained by dividing a pixel group included in a line of which the vertical-direction line number is 2m and a pixel group included in a line of which the vertical-direction line number is (2m+1) into a prescribed number of divisions.

(15)

The image restoration apparatus according to (14), in which the number of divisions is calculated on a basis of a transmission capacity per transmission path and a transmission rate of the video signal.

(16)

The image restoration apparatus according to (14) or (15), in which, in a case where the number of divisions is a multiple of 4, four pixels indicated by (a horizontal-direction pixel number, the vertical-direction line number)=(2n, 2m), (2n, 2m+1), (2n+1, 2m), and (2n+1, 2m+1) are inputted from different lanes, respectively, in a case where the color format information is RGB or YCbCr444, (2n, 2m) and (2n, 2m+1) are inputted from different lanes, respectively, and (2n+1, 2m) and (2n+1, 2m+1) are inputted from one and the same lane in a case where the color format information is YCbCr422, and (2n, 2m) is inputted from a prescribed lane and (2n, 2m+1), (2n+1, 2m), and (2n+1, 2m+1) are inputted from one and the same lane in a case where the color format information is YCbCr420.

(17)

The image restoration apparatus according to (14) or (15), in which, in a case where the number of divisions is 2, any two of four pixels indicated by (a horizontal-direction pixel number, the vertical-direction line number)=(2n, 2m), (2n+1, 2m), (2n, 2m+1), and (2n+1, 2m+1) are inputted from one and the same lane and other two are inputted from one and the same lane in a case where the color format information is RGB or YCbCr444, (2n, 2m) and (2n+1, 2m) are inputted from one and the same lane and (2n, 2m+1) and (2n+1, 2m+1) are inputted from one and the same lane, or (2n, 2m) and (2n+1, 2m+1) are inputted from one and the same lane and (2n, 2m+1) and (2n+1, 2m) are inputted from one and the same lane in a case where the color format information is YCbCr422, and (2n, 2m), (2n, 2m+1), (2n+1, 2m), and (2n+1, 2m+1) are inputted from one and the same lane in a case where the color format information is YCbCr420.

(18)

An image restoration method including:

if a plurality of frames individually including a plurality of divided signals obtained by performing an operation of dividing a pixel group included in a line of which a vertical-direction line number is 2m and a pixel group included in a line of which the vertical-direction line number is (2m+1) on a basis of color format information of a video signal, for all integers m satisfying 0≤m≤(M/2)−1, are received, acquiring the plurality of divided signals; and
restoring the video signal on a basis of the divided signals.

(19)
An image transmission system including:
a transmitter including
an image division section configured to, in a case where a horizontal-direction pixel number in a video signal is set to integers of 0 to N−1 and a vertical-direction line number in the video signal is set to integers of 0 to M−1, perform an operation of dividing a pixel group included in a line of which the vertical-direction line number is 2m and a pixel group included in a line of which the vertical-direction line number is (2m+1) on a basis of color format information of the video signal, for all integers m satisfying 0≤m≤(M/2)−1, and thereby obtain a plurality of divided signals, and
a frame generation section configured to generate a plurality of frames individually including the plurality of divided signals; and
a receiver including
a signal acquisition section configured to acquire the plurality of divided signals if the plurality of frames are received, and
an image restoration section configured to restore the video signal on a basis of the divided signals.

(20)
An image transmission method including:
in a case where a horizontal-direction pixel number in a video signal is set to integers of 0 to N−1 and a vertical-direction line number in the video signal is set to integers of 0 to M−1, performing an operation of dividing a pixel group included in a line of which the vertical-direction line number is 2m and a pixel group included in a line of which the vertical-direction line number is (2m+1) on a basis of color format information of the video signal, for all integers m satisfying 0≤m≤(M/2)−1, and thereby obtaining a plurality of divided signals;
generating a plurality of frames individually including the plurality of divided signals;
acquiring the plurality of divided signals if the plurality of frames are received; and
restoring the video signal on a basis of the divided signals.

REFERENCE SIGNS LIST 100 transmitter (frame generation apparatus)
101 image generation section
102 image division section
1021 line output section
1022 pixel output section
1023 pixel element output section
103 number-of-divisions calculation section
104 signal output section
105 assignment section
106 packet generation section
107 frame generation section
108 transmission section
200 receiver (image restoration apparatus)
201 image display section
202 image restoration section
203 restoration control section
204 signal output section
206 signal acquisition section
207 identification information extraction section
208 reception section
300 cable
301 transmission path

The invention claimed is:

1. A frame generation apparatus, comprising:
circuitry configured to:
divide a pixel group included in a first line of a video signal and a pixel group included in a second line of the video signal, based on color format information of the video signal, wherein
a horizontal-direction pixel number in the video signal is set to integers of 0 to N−1,
a vertical-direction line number in the video signal is set to integers of 0 to M−1, and
a vertical-direction line number of the first line is 2m, and a vertical-direction line number of the second line is 2m+1, wherein m is an integer satisfying 0≤m≤(M/2)−1;
obtain a plurality of divided signals;
generate a plurality of frames including the plurality of divided signals, wherein each frame of the plurality of frames includes the plurality of divided signals;
mark a frame start identifier on a head of each frame of the plurality of frames; and
substitute the frame start identifier with a first code.

2. The frame generation apparatus according to claim 1, wherein the circuitry is further configured to mark position information in the video signal of a head pixel of each line of the plurality of divided signals, on a position of the frame.

3. The frame generation apparatus according to claim 2, wherein
one of the frame start identifier or a blanking section exists on a front side of each line of a divided signal of the plurality of divided signals of a frame of the plurality of frames, and
the circuitry is further configured to:
substitute the blanking section with a second code; and
mark the position information on the position, based on one of a position of the frame start identifier or a position of the blanking section as a reference.

4. The frame generation apparatus according to claim 1, wherein the circuitry is further configured to divide the pixel group included in the first line and the pixel group included in the second line into a number of divisions.

5. The frame generation apparatus according to claim 4, wherein the circuitry is further configured to calculate the number of divisions based on a transmission capacity per transmission path of the video signal and a transmission rate of the video signal.

6. The frame generation apparatus according to claim 4, wherein, when the number of divisions is a multiple of 4, the circuitry is further configured to:
outputs four pixels indicated by (the horizontal-direction pixel number, the vertical-direction line number)=(2n, 2m), (2n, 2m+1), (2n+1, 2m), and (2n+1, 2m+1) to different lanes corresponding to the four pixels, when the color format information is one of RGB or YCbCr444;
output two pixels indicated by (2n, 2m) and (2n, 2m+1) to different lanes corresponding to the pixels indicated by (2n, 2m) and (2n, 2m+1), when the color format information is YCbCr422; and
output two pixels indicated by (2n+1, 2m) and (2n+1, 2m+1) to a lane corresponding to one of the two pixels indicated by (2n+1, 2m) or (2n+1, 2m+1), when the color format information is YCbCr422;
output a pixel indicated by (2n, 2m) to a lane corresponding to the pixel indicated by (2n, 2m) when the color format information is YCbCr420; and output three pixels indicated by (2n, 2m+1), (2n+1, 2m), and (2n+1, 2m+1) to a lane corresponding to one of the three pixels indicated by (2n, 2m+1), (2n+1, 2m), or (2n+1, 2m+1), when the color format information is YCbCr420.

7. The frame generation apparatus according to claim 4, wherein, when the number of divisions is 2, the circuitry is configured to:
output, when the color format information is one of RGB or YCbCr444,
two of four pixels indicated by (the horizontal-direction pixel number, the vertical-direction line number)=(2n, 2m), (2n, 2m+1), (2n+1, 2m+1), and (2n+1, 2m) to a lane corresponding to pixels indicated by one of (2n, 2m) or (2n, 2m+1); and
other two of the four pixels to a lane corresponding to pixels indicated by other one of (2n, 2m) or (2n, 2m+1)
output, when the color format information is RGB or YCbCr422,
one of:
two pixels indicated by (2n, 2m) and (2n+1, 2m) to a lane corresponding to one of the two pixels indicated by (2n, 2m) and (2n+1, 2m);and
two pixels indicated by (2n, 2m+1) and (2n+1, 2m+1) to a lane corresponding to one of the two pixels indicated by (2n, 2m+1) and (2n+1, 2m+1),
or
two pixels indicated by (2n, 2m) and (2n+1, 2m+1) to a lane corresponding to one of the two pixels indicated by (2n, 2m) and (2n+1, 2m+1), and
two pixels indicated by (2n, 2m+1) and (2n+1, 2m) to a lane corresponding to one of the two pixels indicated by (2n, 2m+1) and (2n+1, 2m); and
output four pixels indicated by (2n, 2m), (2n, 2m+1), (2n+1, 2m), and (2n+1, 2m+1) to a lane corresponding to one of the four pixels indicated by(2n, 2m), (2n, 2m+1), (2n+1, 2m), or (2n+1, 2m+1), when the color format information is YCbCr420.

8. A frame generation method, comprising:
dividing, by a circuitry, a pixel group included in a first line and a pixel group included in a second line, based on color format information of a video signal, wherein
a horizontal-direction pixel number in the video signal is set to integers of 0 to N−1,
a vertical-direction line number in the video signal is set to integers of 0 to M−1, and
a vertical-direction line number of the first line is 2m, and a vertical-direction line number of the second line is 2m+1, wherein m is an integer satisfying 0≤m≤(M/2)−1;
obtaining, by the circuitry, a plurality of divided signals;
generating by the circuitry a plurality of frames including the plurality of divided signals, wherein each frame of the plurality of frames includes the plurality of divided signals;
marking, by the circuitry, a frame start identifier on a head of each frame of the plurality of frames; and
substituting, by the circuitry, the frame start identifier with a code.

9. An image restoration apparatus, comprising:
circuitry configured to:
acquire a plurality of divided signals based on reception of a plurality of frames,
wherein the plurality of divided signals is based on:
division of a pixel group included in a first line of a video signal and a pixel group included in a second line of the video signal, based on color format information of the video signal, wherein
a vertical-direction line number of the first line is 2m, and
a vertical-direction line number of the second line is 2m+1, wherein m is an integer satisfying 0≤m≤(M/2)−1;
generation of a plurality of frames including the plurality of divided signals;
mark of a frame start identifier on a head of each frame of the plurality of frames; and
substitution of the frame start identifier with a code; and
restore the video signal based on the plurality of divided signals.

10. The image restoration apparatus according to claim 9, wherein the circuitry is further configured to acquire each divided signal of the plurality of divided signals based on a position of the frame start identifier.

11. The image restoration apparatus according to claim 9, wherein
the circuitry is further configured to restore the video signal based on position information in the video signal of a head pixel of each line of the plurality divided signals, and
the position information in the video signal of a head pixel is marked on a position of a frame of the plurality of frames.

12. The image restoration apparatus according to claim 11, wherein
one of the frame start identifier or a blanking section exists on a front side of each line of a divided signal of the plurality of divided signals of the frame,
the circuitry is further configured to restore the video signal based on the position information marked on the position,
the position is with respect to one of a position of the frame start identifier or a position of the blanking section as a reference.

13. The image restoration apparatus according to claim 9, wherein the division of the pixel group included in the first line and the pixel group included in the second line is associated with a number of divisions.

14. The image restoration apparatus according to claim 13, wherein the number of divisions is calculated based on a transmission capacity per transmission path of the video signal and a transmission rate of the video signal.

15. The image restoration apparatus according to claim 13, wherein, when the number of divisions is a multiple of 4, the circuitry is further configured to acquire:
four pixels indicated by (a horizontal-direction pixel number, the vertical-direction line number)=(2n, 2m), (2n, 2m+1), (2n+1, 2m), and (2n+1, 2m+1) from different lanes, corresponding to the four pixels, when the color format information is one of RGB or YCbCr444,
two pixels indicated by (2n, 2m) and (2n, 2m+1) from different lanes, corresponding to the pixels, when the color format information is YCbCr422;
two pixels indicated by (2n+1, 2m) and (2n+1, 2m+1) from a lane corresponding to one of the two pixels indicated by (2n+1, 2m) or (2n+1, 2m+1), when the color format information is YCbCr422;

a pixel indicated by (2n, 2m) from a lane corresponding to the pixel indicated by (2n, 2m), when the color format information is YCbCr420; and three pixels indicated by (2n, 2m+1), (2n+1, 2m), and (2n+1, 2m+1) from a lane corresponding to one of the three pixels indicated by (2n, 2m+1), (2n+1, 2m), or (2n+1, 2m+1), when the color format information is YCbCr420.

16. The image restoration apparatus according to claim 13,
wherein, in a case where the number of divisions is 2, the circuitry is further configured to acquire:
when the color format information is one of RGB or YCbCr444:
two of four pixels indicated by (a horizontal-direction pixel number, the vertical-direction line number) =(2n, 2m), (2n+1, 2m), (2n, 2m+1), and (2n+1, 2m+1) from a lane corresponding to pixels indicated by one of (2n, 2m) or (2n, 2m+1); and
other two of the four pixels from a lane corresponding to pixels indicated by other one of the (2n, 2m) or (2n, 2m+1);
when the color format information is YCbCr422, one of:
two pixels indicated by (2n, 2m) and (2n+1, 2m) from a lane corresponding to one of the two pixels indicated by (2n, 2m) and (2n+1, 2m); and
two pixels indicated by (2n, 2m+1) and (2n+1, 2m+1) from a lane corresponding to one of the two pixels indicated by (2n, 2m+1) or (2n+1, 2m+1),
or
two pixels indicated by (2n, 2m) and (2n+1, 2m+1) from a lane corresponding to one of the two pixels indicated by (2n, 2m) or (2n+1, 2m+1); and
two pixels indicated by (2n, 2m+1) and (2n+1, 2m) from a lane corresponding to one of the two pixels indicated by (2n, 2m+1) or (2n+1, 2m); and
four pixels indicated by (2n, 2m), (2n, 2m+1), (2n+1, 2m), and (2n+1, 2m+1) from a lane corresponding to one of the four pixels indicated by(2n, 2m), (2n, 2m+1), (2n+1, 2m), or (2n+1, 2m+1), when the color format information is YCbCr420.

17. An image restoration method, comprising:
acquiring, by circuitry, a plurality of divided signals, wherein the plurality of divided signals is based on:
dividing a pixel group included in a first line of a video signal and a pixel group included in a second line of the video signal, based on color format information of the video signal, wherein
a vertical-direction line number of the first line is 2m, and
a vertical-direction line number of the second line is 2m+1, wherein m is an integer satisfying $0 \leq m \leq (M/2)-1$;
generating a plurality of frames including the plurality of divided signals;
marking a frame start identifier on a head of each frame of the plurality of frames; and
substituting the frame start identifier with a code; and
restoring the video signal based on the plurality of divided signals.

18. An image transmission system, comprising:
a transmitter including first circuitry configured to:
divide a pixel group included in a first line of a video signal and a pixel group included in a second line of the video signal, based on color format information of the video signal wherein
a horizontal-direction pixel number in the video signal is set to integers of 0 to N−1,
a vertical-direction line number in the video signal is set to integers of 0 to M−1, and
a vertical-direction line number of the first line is 2m, and a vertical-direction line number of the second line is 2m+1, wherein m is an integer satisfying $0 \leq m \leq (M/2)-1$;
obtain a plurality of divided signals,
generate a plurality of frames including the plurality of divided signals, wherein each frame of the plurality of frames includes the plurality of divided signals;
mark a frame start identifier on a head of each frame of the plurality of frames; and
substitute the frame start identifier with a code; and
a receiver including second circuitry configured to:
acquire the plurality of divided signals based on reception of the plurality of frames; and
restore the video signal based on the plurality of divided signals.

19. An image transmission method, comprising:
in an image transmission system comprising a transmitter and a receiver, wherein
the transmitter includes first circuitry,
the receiver includes second circuitry:
dividing, by the first circuitry, a pixel group included in a first line of a video signal and a pixel group included in a second line of the video signal, based on color format information of the video signal, wherein
a horizontal-direction pixel number in the video signal is set to integers of 0 to N−1,
a vertical-direction line number in the video signal is set to integers of 0 to M−1, and
a vertical-direction line number of the first line is 2m, and a vertical-direction line number of the second line is 2m+1, wherein m is an integer satisfying $0 \leq m \leq (M/2)-1$;
obtaining, by the first circuitry, a plurality of divided signals;
generating, by the first circuitry, a plurality of frames including the plurality of divided signals, wherein each frame of the plurality of frames includes the plurality of divided signals;
marking, by the first circuitry, a frame start identifier on a head of each frame of the plurality of frames;
substituting, by the first circuitry, the frame start identifier with a code;
acquiring, by the second circuitry, the plurality of divided signals based on reception of the plurality of frames; and
restoring the video signal based on the plurality of divided signals.

* * * * *